United States Patent [19]

Seitz et al.

[11] Patent Number: 4,968,781

[45] Date of Patent: Nov. 6, 1990

[54] FIBER-REACTIVE DYES COMPRISING A HALOPYRIMIDINE FOR WHICH A VINYLSULFONYL OR THE LIKE MOIETY IS ATTACHED VIA A BRIDGE MEMBER

[75] Inventors: Karl Seitz, Oberwil; Karl Hoegerle, Basel, both of Switzerland

[73] Assignee: Ciba-Geigy Corporation, Ardsley, N.Y.

[21] Appl. No.: 173,965

[22] Filed: Mar. 28, 1988

[30] Foreign Application Priority Data

Apr. 2, 1987 [CH] Switzerland ..................... 1258/87-0
Aug. 27, 1987 [CH] Switzerland ..................... 3287/87-5

[51] Int. Cl.$^5$ .................. C09B 62/20; C09B 62/24; C09B 62/44; C09B 62/62

[52] U.S. Cl. ................................ 534/618; 534/617; 534/619; 534/622; 534/624; 534/625; 534/628; 534/632; 534/634; 534/604; 534/605; 534/606; 534/635; 534/636; 534/637; 534/638; 534/643; 534/629; 534/641; 544/75; 544/76; 544/99; 544/187; 544/322; 544/323; 544/326

[58] Field of Search .............. 534/617, 643, 618, 622, 534/624, 625, 605, 606, 634, 635, 636, 637, 638, 619; 544/187, 99, 322, 75, 76, 323, 326

[56] References Cited

U.S. PATENT DOCUMENTS

| | | | |
|---|---|---|---|
| 4,709,018 | 11/1987 | Seitz | 534/618 |
| 4,766,206 | 8/1988 | Tzikas | 534/637 |
| 4,782,140 | 11/1988 | Tzikas | 534/619 |

FOREIGN PATENT DOCUMENTS

| | | | |
|---|---|---|---|
| 0144766 | 6/1985 | European Pat. Off. | 534/617 |
| 0214093 | 3/1987 | European Pat. Off. | 534/617 |
| 2310334 | 9/1973 | Fed. Rep. of Germany | 534/752 |
| 3603797 | 8/1987 | Fed. Rep. of Germany | 534/617 |
| 1546109 | 10/1968 | France | 534/618 |
| 1118785 | 7/1968 | United Kingdom | 534/618 |

OTHER PUBLICATIONS

Chem. Abstracts, vol. 79, 146548n p. 330(1973), Schlager II.
Chem. Abstracts, vol. 108, 75112 (1988), Dehnert II.

*Primary Examiner*—Floyd D. Higel

*Attorney, Agent, or Firm*—Kevin T. Mansfield; George R. Dohmann

[57] ABSTRACT

A reactive dye of the formula

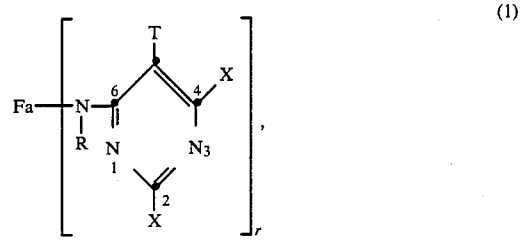

in which Fa is the radical of an organic dye of the monoazo, polyazo, metal complex azo, anthraquinone, phthalocyanine, formazan, azomethine, dioxazine, phenazine, stilbene, triphenylmethane, xanthene, thioxanthone, nitroaryl, naphthoquinone, pyrenequinone or perylenetetracarbimide series, T is a negative substituent, one X is a detachable substituent and the other X is a group of the formula

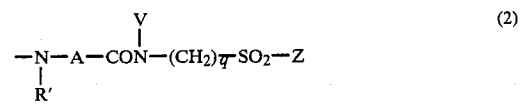

or of the formula

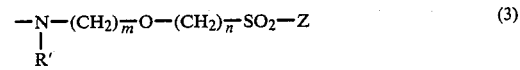

A is arylene, V is hydrogen, a substituted or unsubstituted $C_1$–$C_4$alkyl radical or a radical of the formula —$(CH_2)_q$—$SO_2$—Z, Z is a —CH=$CH_2$ or $CH_2$—Y radical and Y is an inorganic or organic radical which is detachable under alkaline conditions, q, m and n are independently of one another an integral number from 2 to 6, R and R' are independently of one another hydrogen or substituted or unsubstituted $C_1$–$C_4$alkyl, and r is 1 or 2. The inventive dyes are especially suitable for dyeing and printing cellulose-containing fiber materials by the cold pad-batch method.

21 Claims, No Drawings

FIBER-REACTIVE DYES COMPRISING A HALOPYRIMIDINE FOR WHICH A VINYLSULFONYL OR THE LIKE MOIETY IS ATTACHED VIA A BRIDGE MEMBER

The present invention relates to novel reactive dyes, to processes for their preparation and to the use thereof for dyeing or printing fibre materials.

The practice of dyeing with reactive dyes has recently led to increased demands on the quality of the dyeings and on the economics of the dyeing process. There consequently continues to be a demand for new reactive dyes which have improved properties, in particular in respect of application.

The present demand in the dyeing of cotton by the cold pad-batch method is for reactive dyes which have adequate substantivity at the low dyeing temperature and which also have good wash-off properties in respect of the unfixed portions. They should further have a high reactivity, so that only short batching times are required, and they should in particularly produce dyeings of high degrees of fixation. These demands are met only inadequately by known dyes.

The present invention therefore has for its object to fixed new, improved reactive dyes for the cold pad-batch method which have the above-characterized qualities to a high degree. The new dyes should be distinguished in particular by high degrees of fixation and high fibre-dye bond stabilities, and moreover the portions not fixed on the fibre should be easy to wash off. They should further produce dyeings having good allround fastness properties, for example light and wet fastness properties.

It is has been found that this object is achieved with the novel reactive dyes defined hereinafter.

The invention accordingly provides reactive dyes of the formula

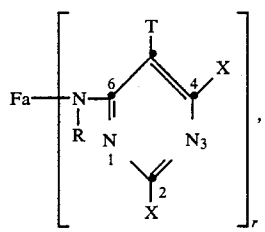

(1)

in which Fa is the radical of an organic dye of the monoazo, polyazo, metal complex azo, anthraquinone, phthalocyanine, formazan, azomethine, dioxazine, phenazine, stilbene, triphenylmethane, xanthene, thioxanthone, nitroraryl, naphthoquinone, pyrenequinone or perylenetetracarbimide series, T is a negative substituent, one X is a detachable substituent and the other X is a group of the formula

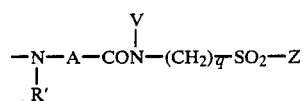

or of the formula $$-N-(CH_2)_{\overline{m}}O-(CH_2)_{\overline{n}}SO_2-Z \quad (3)$$
$$| \\ R'$$

A is arylene, V is hydrogen, a substituted or unsubstituted $C_1$-$C_4$alkyl radical or a radical of the formula $-(CH_2)_q-SO_2-Z$, Z is a $-CH=CH_2$ or $-CH_2-CH_2-Y$ radical and Y is an inorganic or organic radical which is detachable under alkaline conditions, q, m and n are independently of one another an integer from 2 to 6, R and R' are independently of one another hydrogen or substituted or unsubstituted $C_1$-$C_4$alkyl, and r is 1 or 2.

The Fa radical in formula (1) can contain bonded to its skeleton the substituents customary with organic dyes.

Examples of suitable substituents in the Fa radical are: $C_1$-$C_4$alkyl, which generally comprises methyl, ethyl, n-propyl, isopropyl, n-butyl, sec-butyl and tert-butyl; $C_1$-$C_4$alkoxy, which is to be understood as meaning is general methoxy, ethoxy, n-propoxy, isopropoxy, n-butoxy, sec-butoxy and tert-butoxy; $C_1$-$C_4$alkanoylamino, in particular acetylamino and propionylamino; benzoylamino; amino; N-mono- or N,N-di-$C_1$-$C_4$-alkylamino, where the alkyl can be further substituted, for example by $-OH$, $-OCOCH_3$, $-OSO_3H$, $-CN$ or halogen, e.g. methylamino, ethylamino, n-propylamino or iso-propylamino, n-, sec- or tert-butylamino, N,N-di-β-hydroxyethylamino, N,N-di-β-sulfatoethylamino, hydroxypropylamino, β-sulfatoethylamino, β-chloroethylamino, β-acetyloxyethylamino; phenylamino; mono- or di-sulfobenzylamino; $C_1$-$C_4$alkoxycarbonyl, e.g. methoxycarbonyl or ethoxycarbonyl; $C_1$-$C_4$alkylsulfonyl, e.g. methylsulfonyl or ethylsulfonyl; trifluoromethyl; nitro; cyano; halogen, which is to be understood as meaning in general fluorine, chlorine and bromine; carbamoyl; N-mono- or N,N-di-$C_1$-$C_4$alkylcarbamoyl; sulfamoyl; N-mono- or N,N-di-$C_1$-$C_4$-alkylsulfamoyl; N-(β-hydroxyethyl)sulfamoyl; N,N-di-(β-hydroxyethyl)sulfamoyl; N-phenylsulfamoyl; hydroxyl; carboxyl; sulfo; sulfomethyl; ureido.

Fa is preferably the radical of an organic dye of the monoazo, polyazo, metal complex azo, anthraquinone, phthalocyanine, formazan or dioxazine series which is substituted by one or more of the abovementioned radicals.

Particularly preferably the Fa radical contains one or more sulfo groups and can be further substituted by one or more of the abovementioned radicals.

A monoazo or disazo dye radical Fa is substituted particularly preferably by one or more radicals selected from the group consisting of methyl, ethyl, methoxy, ethoxy, acetylamino, benzoylamino, amino, chlorine, bromine, ureido, hydroxyl, carboxyl, sulfomethyl and sulfo.

A substituted $C_1$-$C_4$alkyl radical R and/or R' can be for example a halogen-, hydroxyl-, cyano-, carboxyl-, sulfo-, sulfato-, $C_1$-$C_4$alkoxycarbonyl- or $C_1$-$C_4$alkoxy-substituted $C_1$-$C_4$alkyl radical.

Examples of substituted C₁-C₄alkyl radicals are: carboxymethyl β-carboxyethyl, methoxycarbonylmethyl, ethoxycarbonylmethyl, β-methoxyethyl, β-ethoxyethyl, β-chloroethyl, γ-bromopropyl, β-hydroxyethyl, β-hydroxybutyl, β-cyanomethyl, sulfomethyl, β-sulfoethyl and β-sulfatoethyl.

R and R' are preferably independently of one another methyl or ethyl and in particular hydrogen.

The radical T is to be understood as meaning a substituent having an (—I) and/or (—M) effect.

Examples of suitable negative substituents T are: nitro, cyano, C₁-C₄-alkylsulfonyl, in particular methylsulfonyl or ethylsulfonyl, carboxyl, chlorine, C₁-C₄alkoxysulfonyl, C₁-C₄alkoxysulfinyl, C₁-C₄-alkoxy-carbonyl, C₁-C₄alkanoyl, in particular formyl.

Preferably, T is cyano, methylsulfonyl, ethylsulfonyl, chlorine, formyl or nitro and particularly preferably cyano, methylsulfonyl or formyl.

The detachable substituent X is for example a halogen atom such as fluorine, chlorine or bromine, a C₁-C₄alkylsulfonyl group such as methylsulfonyl or ethylsulfonyl, a phenylsulfonyl radical, a sulfonic acid or phosphoric acid group or a quaternized ammonium group.

Preferably, the detachable substituent X is fluorine or chlorine.

In a group X of the aforementioned formula (2), arylene A is for example the bivalent radical of a benzene, or a naphthalene, of a biphenyl, of a stilbene, of a diphenylmethane or of a diphenyl ether.

The arylene can be unsubstituted or substituted, for example by C₁-C₄-alkyl, in particular methyl or ethyl, C₁-C₄alkoxy, in particular methoxy or ethoxy, halogen such as fluorine, chlorine or bromine, nitro, cyano, ureido, acetylamino, hydroxyl, carboxyl and/or sulfo.

Preferably, A is an unsubstituted or for example, sulfo-, ureido-, methyl-, ethyl-, methoxy-, ethoxy-, chlorine-, hydroxyl- or carboxyl-substituted 1,3-, or 1,4-phenylene radical.

q, m and n are preferably independently of one another an integer from 2 to 4, particularly preferably 2.

An inorganic or organic radical Y which is detachable under alkaline conditions is for example one of the following detachable groups:

—OSO₃H, —SSO₃H, —OCOCH₃, —OPO₃H₂,

—O—CO—C₆H₅, —S—C(=S)—N(C₂H₅)₂, ⁺N(CH₃)₃ X⁻, —Cl, (X = halogen)

—Br, —F, 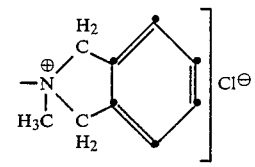 Cl⁻, —N(CH₃)₃]CH₃SO₄⁻

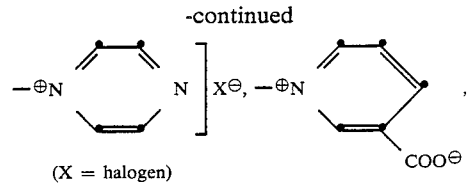

(X = halogen)

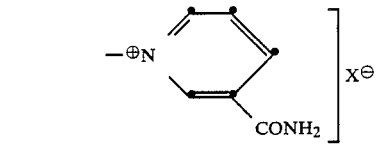

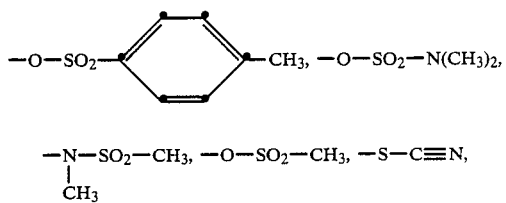

—N(CH₃)—SO₂—CH₃, —O—SO₂—CH₃, —S—C≡N,

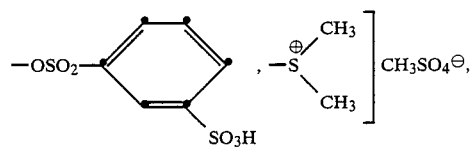

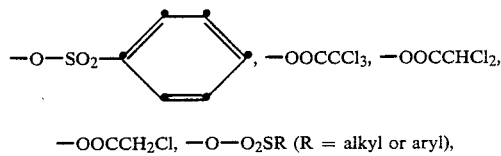

—OOCCH₂Cl, —O—O₂SR (R = alkyl or aryl),

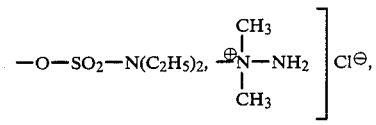

Preferably, Y is an —SSO₃H, —SSO₃H, —OPO₃H₂, —Cl or —O—CO—C₆H₅ group, and particularly preferably —OSO₃H.

In a preferred embodiment of the reaction dyes of the formula (1) according to the invention, Z is a —CH=CH₂ radical.

A substituted C₁-C₄alkyl radical V can be for example have the meanings mentioned above for R and R'.

A radical C of the formula —(CH₂)_q—SO₂—Z can differ from, or preferably conform to, the second —(CH₂)_q—SO₂—Z radical present in the group of the formula (2).

V is preferably hydrogen, methyl, ethyl or a —(CH₂)_q—SO₂—Z group; V is particularly preferably hydrogen.

Preferably, the radical X which is detachable as an anion is arranged in the 2-position and the group of the formula (2) or (3) in the 4-position in the pyrimidine radical.

Preference is given in particular to reactive dyes of the formula (I) in which one X is a detachable substituent and the other X is a group of the formula

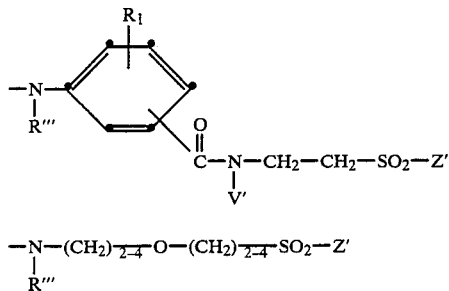

in which R''' and V' are independently of one another hydrogen or C$_1$–C$_4$alkyl, R$_1$ is hydrogen, sulfo, ureido, chlorine, methyl, ethyl, methoxy, ethoxy, hydroxyl or carboxyl, Z' is a —CH=CH$_2$ or —CH$_2$—CH$_2$—Y' group, and Y' is —OSO$_3$H, —SSO$_3$H, —OCOOH$_3$, —OPO$_3$H$_2$, —Cl or —OCO—C$_6$H$_5$.

Consideration has also to be given to reactive dyes of the formula

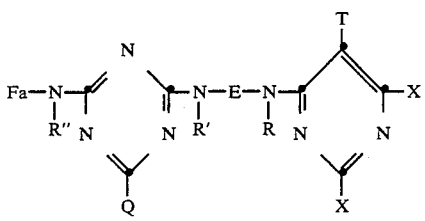

in which Fa, T, R, R' and X are each as defined under the formula (1), R'' independently has the meaning of N, E is a substituted or unsubstituted aliphatic or aromatic bridge member, and Q is a halogen atom, a substituted or unsubstituted amino group, hydroxyl, a C$_1$–C$_4$alkoxy, phenyloxy, C$_1$–C$_4$alkylthio or phenylthio group. The bridge member E is preferably an alkylene or arylene radical. For instance, E can be a long (comprising for example 10 more more carbon atoms) or shorter, straight-chain or branched alkylene radical; in particular, an alkylene radical having 2 to 6 carbon atoms comes into consideration, for example ethylene, propylene, butylene, hexylene or cyclohexylene. An arylene radical E is for example a naphthalene radical, the radical of a biphenyl or stilbene or in particular a phenylene radical. The radical E can contain further substituents, for example halogen atoms, such as fluorine, chlorine and bromine, alkyl groups having 1 to 4 carbon atoms, such as methyl, ethyl and propyl, alkoxy groups having 1 to 4 carbon atoms, such as methoxy, ethoxy, propyloxy and isopropyloxy, carboxyl or sulfo.

The part of the formula (1) which is enclosed in square brackets is a reactive radical which can be present once or twice in the molecule; if r is 2, the two reactive radicals can be identical or different; preferably, the two radicals are identical.

Particular preference is given to reactive dyes of the formula (1) in which r is 1.

The compounds of the formula (1) are fibre-reactive. The term fibre-reactive compounds as used herein is to be understood as meaning those which are capable of reacting with the hydroxyl groups of cellulose, with the amino, carboxyl, hydroxyl and thiol groups in the case of wool and silk or with the amino and possibly carboxyl groups of synthetic polyamides to form covalent chemical bonds.

A preferred group of reactive dyes according to the invention comprises compounds of the aforementioned formula (1) in which Fa is the radical of an organic dye of the monoazo, polyazo, metal complex azo, anthraquinone, phthalocyanine, formazan or dioxazine series which carries one or more sulfo groups and can be further substituted by one or more of the aforementioned radicals, R is hydrogen or an unsubstituted or for example halogen-, hydroxyl-, cyano-, carboxyl-, sulfo-, sulfato-, C$_1$–C$_4$alkoxycarbonyl or C$_1$–C$_4$alkoxy- substituted C$_1$–C$_4$alkyl radical, T is cyano, nitro, chlorine, formyl, methylsulfonyl or ethylsulfonyl, one X is chlorine or fluorine and the other X is a group of the formula

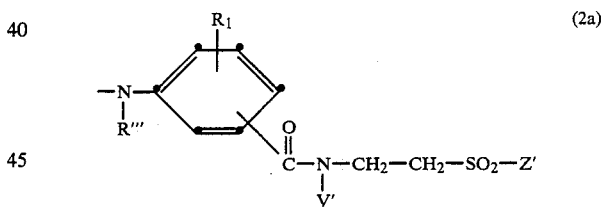

where R''' and V' are independently of one another hydrogen or C$_1$-C$_4$-alkyl, Z' is a —CH=CH$_2$ or —CH$_2$—CH$_2$-Y' group, Y' is —OSO$_3$H, —SSO$_3$H, —OCOOH$_3$, —OPO$_3$H$_2$, —Cl or —OCO—C$_6$H$_5$, R$_1$ is hydrogen, sulfo, ureido, chlorine, methyl, ethyl, methoxy, ethoxy, hydroxyl or carboxyl, and r is 1.

A particularly preferred embodiment of the present invention relates to reactive dyes of the formula

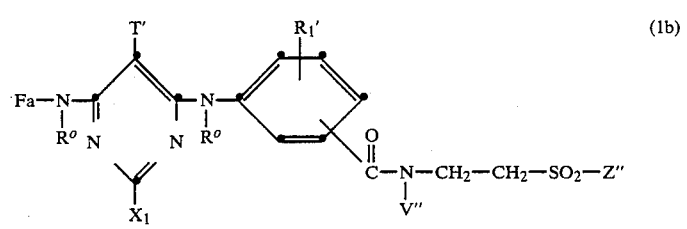

in which Fa is subject to the aforementioned definitions and preferences, T' is methylsulfonyl, formyl or cyano, $X_1$ is fluorine or chlorine, $R^o$ and V" are independently of one another hydrogen, methyl or ethyl, Z" is a —CH=CH$_2$, —CH$_2$—CH$_2$—CSO$_3$H, —CH$_2$—CH$_2$—Cl or —CH$_2$—CH$_2$—OCOCH$_3$ group, and $R_1$ is hydrogen, sulfo, ureido or carboxyl.

A further group of usable reactive dyes according to the invention comprises compounds of the formula (1) in which Fa, R, T and n are subject to the aforementioned definitions and preferences and one X is chlorine or fluorine and the other X is a group of the formula

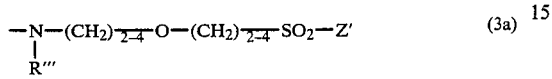

in which R''' and Z' are each defined as under the formula (2a).

Preference is given here in particular to compounds of the formula

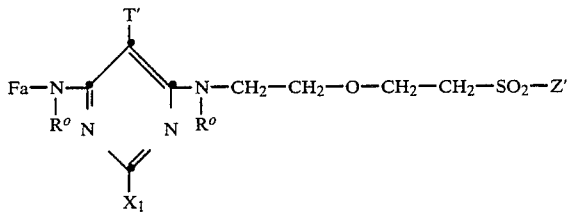

in which Fa, $R^o$, R', $X_1$ and Z" are each defined as under the formula (1b).

Preferred subgroups of the reactive dyes of the formula (1) are:

(a) monoazo or disazo dyes of the formula

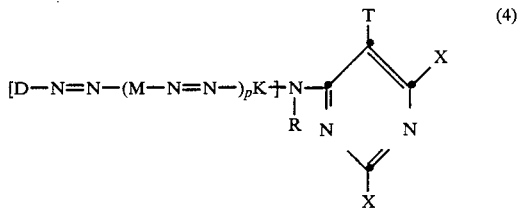

or of the formula

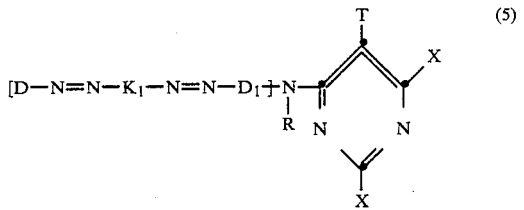

in which R, T and X are each subject to the aforementioned definitions and preferences, D and $D_1$ independently of one another are a diazo component of the benzene or naphthalene series, M is a central component of the benzene or naphthalene series, K is a coupling component of the benzene or naphthalene series or of the heterocyclic series, $K_1$ is the radical of a coupling component of the aminonaphtholsulfonic acid series, and p is 0 or 1.

Suitable subgroups of the reactive dyes of the formula (4) are compounds of the formula

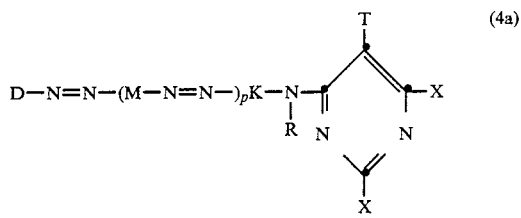

and compounds of the formula

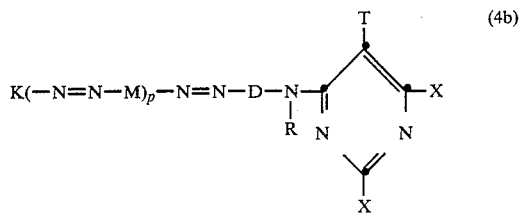

in which R, T, X, K, D, M and p are each as defined above.

Consideration must also be given to reactive dyes of the formulae (4), (4a), (4b) and (5) which the radical D, $D_1$ and/or K additionally includes a further reactive radical, thus also encompassing tri- and tetra-reactive dyes. The additional reactive radicals included in D, $D_1$ or K can be bonded to D, $D_1$ or K via an amino group or in some other way, for example by way of a direct bond.

Any additional reactive radical included in D, $D_1$ or K is, or contains, in particular a low molecular weight alkanoyl or alkylsulfonyl radical which is substituted by a detachable atom or group; a low molecular weight alkenoyl or alkenesulfonyl radical which can be substituted by a detachable atom or group; a carbocyclic or heterocyclic radical which contains 4-, 5- or 6-rings and is bonded via a carbonyl or sulfonyl group and substituted by a detachable atom or group; or a triazine or pyrimidine radical which is bonded directly via a carbon atom and is substituted by a detachable atom or group. Examples of such reactive radicals are a six-membered heterocyclic radical which is bonded via an amino group and contains halogen atoms, such as a halotriazine or halopyrimidine radical, or an aliphatic acyl radical, such as a haloacetyl or halopropionyl radical.

In particular, the additional reactive radical is a vinylsulfonyl, β-sulfatoethylsulfonyl, β-thiosulfatoethylsulfonyl, β-chloroethylsulfonyl or β-acetoxyethylsulfonyl radical bonded directly or via a bridge member.

The above explanations apply mutatis mutandis also to metal complex azo dyes and to other chromophores mentioned in the definition of the dye radical D in formula (1).

The radicals D and $D_2$ can be derived for example from the following diazo components:

aminobenzene, 1-amino-2-, -3- or -4-methylbenzene, 1-amino-2-, -3- or -4-methoxybenzene, 1-amino-2-, -3- or -4-chlorobenzene, 1-amino-2,5-dichlorobenzene, 1-amino-2,5-dimethylbenzene, 1-amino-3-methyl-6-methoxybenzene, 1-amino-2-methoxy-4-nitrobenzene, 1-aminobiphenyl, 1-aminobenzene-2-, -3- or -4-carboxylic acid, 2-aminodiphenyl ether, 1-aminobenzene-2-, -3- or -4-sulfonamide, 1-aminobenzene-2-, -3- or -4- sulfonic acid, 1-aminobenzene-2,4- and -2,5-disulfonic acid, 1-amino-4-methylbenzene-2-sulfonic acid, 1-amino-4-methoxybenzene-2-sulfonic acid, 1-amino-4-ethoxybenzene-2-sulfonic acid, 1-amino-3-methylbenzene-6-sulfonic acid 1-amino-6-methylbenzene-3- or -4-sulfonic acid, 1-aminoaphthalene, 2-aminonaphthalene, 1-aminophthalene-2-, -4-, -5-, -6-, -7- or -8-sulfonic acid, 2-aminonaphthalene-1-, -3-, -4-, -5-, -6-, -7- or -8-sulfonic acid, 1-aminonaphthalene-3,6- or -5,7-disulfonic acid, 2-aminonaphthalene-1,5-, -1,7-, -3,6-, -5,7-, -4,8- or -6,8-disulfonic acid, 1-aminonaphthalene-2,5,7-trisulfonic acid, 2-aminonaphthalene-1,5,7-, -3,6,8- or -4,6,8-trisulfonic acid, 4-aminoazobenzene-3,4'-disulfonic acid, 3-methoxy-4-amino-6-methylazobenzene-2',4'-disulfonic acid, 3-methoxy-4-amino-6-methylazobenzene-2',5'-disulfonic acid, 1-amino-4-β-sulfatoethylsulfonylbenzene, 1-amino-4-vinylsulfonylbenzene, 1-amino-3-vinylsulfonylbenzene, 1-amino-4-β-sulfatoethylsulfonylbenzene-2-sulfonic acid, 1-amino-4-[β(β'-chloroethysulfonyl)ethylaminocarbonyl]-benzene-2-sulfonic acid, 1-amino-4-β-(vinylsulfonyl)ethylaminocarbonylbenzene-2-sulfonic acid, 1-amino-3-γ-(vinylsulfonyl)-butyrylaminobenzene-6-sulfonic acid, 1-amino-3-vinylsulfonyl-6-methoxybenzene, 1-amino-3-β-(vinylsulfonyl)ethylaminocarbonyl-6-methoxybenzene and 1-amino-3- -(vinylsulfonyl)ethylaminocarbonylbenzene; and also diaminobenzenes or diaminonaphthalenes, such as 1,4-diaminobenzene-2-sulfonic acid, 1,4-diaminobenzene-2,5-disulfonic acid, 1,4-diaminobenzene-2,6-disulfonic acid, 1,3-diaminobenzene-4-sulfonic acid, 1,3-diaminobenzene-4,6-disulfonic acid, 1,4-diamino-2-chlorobenzene-5-sulfonic acid, 1,4-diamino-2-methylbenzene-5-sulfonic acid, 1,5-diamino-6-methylbenzene-3-sulfonic acid, 1,3-diamino-6-methylbenzene-4-sulfonic acid, 1,4-diaminobenzene-2-carboxylic acid, 1,3-diaminobenzene-4-carboxylic acid, 1-amino-3-aminomethylbenzene-5-sulfonic acid, 1-amino-3-aminomethyl-4-methoxybenzene-2-sulfonic acid, 2,6-diaminonaphthalene-4,8-disulfonic acid, 2-amino-5-aminomethylnaphthalene-1-sulfonic acid and 2-amino-5-aminomethylnaphthalene-1,7-disulfonic acid; instead of a diamine it is also possible to use an aminoacetylamino compound from which the acetyl group is subsequently eliminated again, e.g. 1-acetylamino-3-aminobenzene-4-sulfonic acid or 1-acetylamino-4-aminobenzene-3-sulfonic acid.

The radical M can be derived for example from the following central components:

aniline, m-toluidine, 2,5-dimethyl- or -dimethoxy-aniline, m-aminoanisole, m-acetylamino-, m-propionylamino-, m-butyrylamino- or m-benzoylaminoaniline, m-aminophenylurea, 4-acetamino-2-amino-toluene or -anisole, 2-amino-4-methylanisole, 1-aminonaphthalene-6- or -7-sulfonic acid, 2-amino-4-acetylaminobenzenesulfonic acid, 2-amino-5-naphthol-7-sulfonic acid, 2-amino-8-naphthol-6-sulfonic acid, 2-(4-aminobenzoylamino)-5-naphthol-7-sulfonic acid, acetoacet-3-sulfo-4-aminoanilide.

From the large number of possible coupling components K and $K_1$ the following may be mentioned by way of example:

phenol, 1-hydroxy-3- or -4-methylbenzene, 1-hydroxybenzene-4-sulfonic acid, 1-hydroxynaphthalene, 2-hydroxynaphthalene, 2-hydroxynaphthalene-6- or -7-sulfonic acid, 2-hydroxynaphthalene-3,6- or -6,8-disulfonic acid, 1-hydroxynaphthalene-4-sulfonic acid, 1-hydroxynaphthalene-4,6- or -4,7-disulfonic acid, 1-amino-3-methylbenzene, 1-amino-2-methoxy-5-methylbenzene, 1-amino-2,5-dimethylbenzene, 3-aminophenylurea, 1-amino-3-acetylaminobenzene, 1-amino-3-hydroxyacetylaminobenzene, 1,3-diaminobenzene-4-sulfonic acid, 1-aminoaphthalene-6- or -8-sulfonic acid, 1-amino-2-methoxynaphthalene-6-sulfonic acid, 2-aminonaphthalene-5,7-disulfonic acid, 1-amino-8-hydroxynaphthalene-4-sulfonic acid, 1-amino-8-hydroxynaphthalene-6-sulfonic acid, 1-amino-8-hydroxynaphthalene-2,4-disulfonic acid, 2-hydroxy-3-aminonaphthalene-5,7-disulfonic acid, 1-amino-8-hydroxynaphthalene-2,4,6-trisulfonic acid, 1-hydroxy-8-acetylaminonaphthalene-3-sulfonic acid, 1-benzoylamino-8-hydroxynaphthalene-3,6- or -4,6-disulfonic acid, 2-benzoylamino-5-hydroxynaphthalene-7-sulfonic acid, 2-amino-5-hydroxynaphthalene-7-sulfonic acid, 2-methyl- or 2-ethylamino-5-hydroxynaphthalene-7-sulfonic acid, 2-(N-acetyl-N-methylamino)-5-hydroxynaphthalene-7-sulfonic acid, 2-acetylamino-5-hydroxynaphthalene-7-sulfonic acid, 2-amino-5-hydroxynaphthalene-1,7-disulfonic acid, 2-amino-8-hydroxynaphthalene-6-sulfonic acid, 2-methyl- or -ethylamino-8-hydroxynaphthalene-6-sulfonic acid, 2-(N-acetyl-N-methylamino)-8-hydroxynaphthalene-6-sulfonic acid, 2-acetylamino-8-hydroxynaphthalene-6-sulfonic acid, 2-amino-8-hydroxynaphthalene-3,6-disulfonic acid, 2-acetylamino-8-hydroxynaphthalene-3,6-disulfonic acid, 1-amino-5-hydroxynaphthalene-7-sulfonic acid, 1-amino-8-hydroxynaphthalene-3,6- or -4,6-di-sulfonic acid, 1-acetylamino-8-hydroxynaphthalene-3,6- or -4,6-disulfonic acid, 1-(4'-aminobenzoylamino)-8-hydroxynaphthalene-3,6-or -4,6-disulfonic acid, 1-(4'-nitrobenzoylamino)-8-hydroxynaphthalene-3,6- or -4,6-disulfonic acid, 1-(3'-aminobenzoylamino)-8-hydroxynaphthalene-3,6- or -4,6-disulfonic acid, 1-(3'-nitrobenzoylamino)-8-hydroxynaphthalene-3,6- or -4,6-disulfonic acid, 2-(4'-amino-3'-sulfophenylamino)-5-hydroxynaphthalene-7-sulfonic acid, 3-methyl-5-pyrazolone, 1-phenyl-3-methyl-5-pyrazoline, 1-(4'-sulfophenyl)-3-methyl-5-pyrazolone, 1-(4'-sulfophenyl)-5-pyrazolone-3-carboxylic acid, 1-(3'-aminophenyl)-3-methyl-5-pyrazolone, 1-(2',5'-disulfophenyl)-3-methyl-5-pyrazolone, 1-(2'-methyl-4'-sulfophenyl)-5-pyrazolone-3-carboxylic acid, 1-(4',8'-disulfo-2'-naphthyl)-3-methyl-5-pyrazolone, 1-(5',7'-disulfo-2'-naphthyl)-3-methyl-5-pyrazolone, 1-(2',5'-dichloro-4-sulophenyl)-3-methyl-5-pyrazolone, 3-aminocarbonyl-4-methyl-6-hydroxy-2-pyridone, 1-ethyl-3-cyano- or -3-chloro-4-methyl-6-hydroxy-2-pyridone, 1-ethyl-3-sulfomethyl-4-methyl-6-hydroxy-2-pyridone, 2,4,6-triamino-3-cyanopyridine, 2-(3'-sulfophenylamino)-4,6-diamino-3-cyanopyridine, 2-(2'-hydroxyethylamino)-3-cyano-4-methyl-6-aminopyridine, 2,6-bis-(2'-hydroxyethylamino)-3-cyano-4-methylpyridine, 1-ethyl-3-carbamoyl-4-methyl-6-hydroxy-2-pyridone, 1-ethyl-3-sulfomethyl-4-methyl-5-carbamoyl-6-hydroxy-2-pyridone, N-acetoacetylaminobenzene, 1-(N-acetoacetylamino)-2-methoxybenzene-5-sulfonic acid, 4-hydroxy-2-quinolone, 1-amino-8-hydroxy-2-(phenylazo)naphthalene-3,6-disulfonic acid, 1-amino-8-hydroxy-2-(4'-sulfophenylazo)-naphthalene-3,6-disulfonic acid, 1-amino-8-hydroxy-2-(2',5'-disulfophenylazo)-naphthalene-3,6-disulfonic acid, 1-β-aminoethyl-3-cyano-4-methyl-6-hydroxy-2-pyridone, 1-γ-aminopropyl-3-sulfomethyl-4-methyl-6-hydroxy-2-pyridone, 1,3-diaminobenzene, 1-amino-3-N,N-di-β-hydroxyethylaminobenzene, 1-amino-3-N,N-di-β-sulfatoethylaminobenzene, 1-amino-3-N,N-di-β-hydroxyethylamino-4-methoxybenzene, 1-amino-3-N,N-di-β-sulfatoethylamino-4-methoxybenzene, 1-amino-3-sulfobenzylaminobenzene, 1-amino-3-sulfobenzylamino-4-chlorobenzene, 1-amino-3-N,N-disulfobenzylaminobenzene, N,N-di-(β-sulfatoethyl)-aniline, 3-acetylamino-N,N-di-(β-sulfatoethyl)-aniline, 3-methyl-N,N-di-(β-sulfatoethyl)aniline, N-ethyl-N-(β-hydroxyethyl)-aniline, N-ethyl-N-(β-acetoxyethyl)-aniline, 3-acetylamino-N,N-di(β-hydroxyethyl)-aniline, 3-methyl-N,N-di-(β-acetoxyethyl)-aniline, 2-methoxy-5-acetylamino-N-(β-acetoxyethyl)-N-benzylaniline, 2-chloro-5-acetylamino-N-(γ-phenoxy-β-hydroxy-n-propyl)-aniline, 3-ureidoaniline, N-ethyl-N-(3'-sulfobenzyl)-aniline, 3-methyl-N-ethyl-N-(β-sulfatoethyl)-aniline, 3-methyl-N,N-di-(β-hydroxyethyl)-aniline, 3-methyl-6-methoxy-N,N-di-(β-hydroxyethyl)-aniline.

In reactive dyes of the formula (4) or (5) according to the invention, where Fa in formula (1) is accordingly the radical of a monoazo or disazo compound, this radical can be derived for example from the following organic monoazo or disazo dyes:

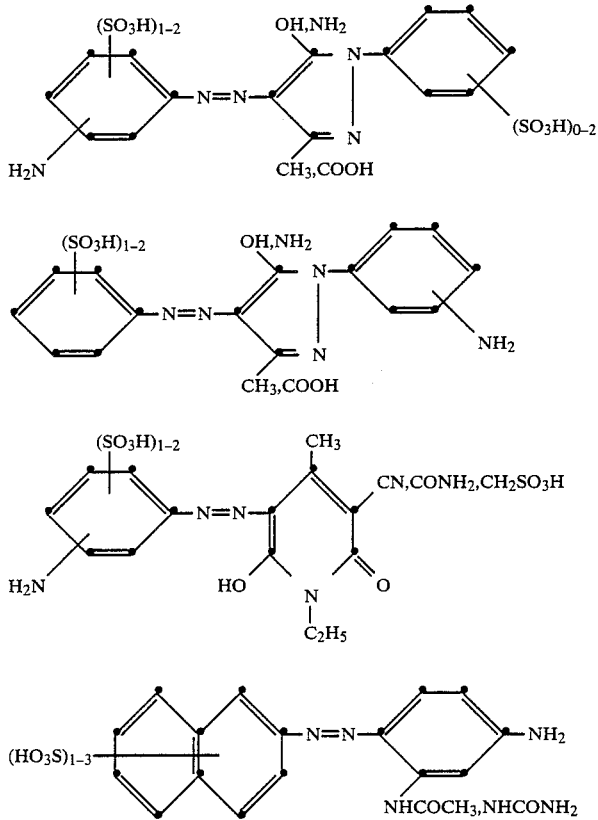

-continued
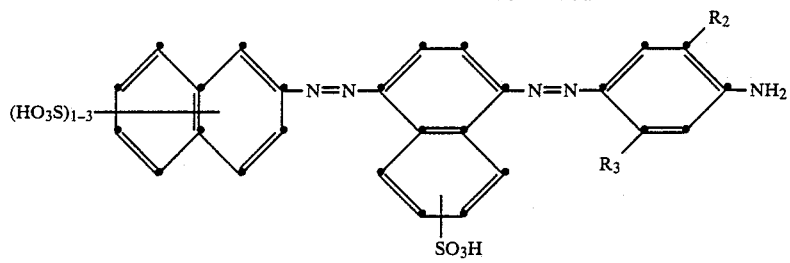
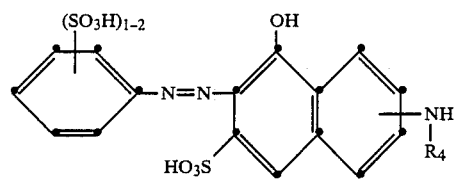
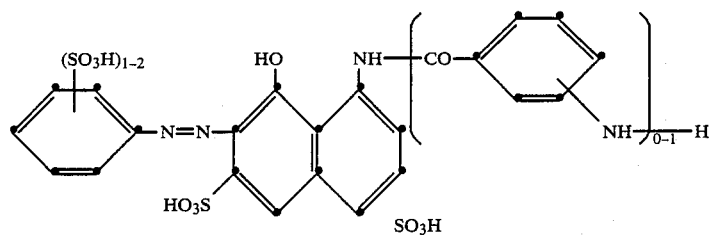
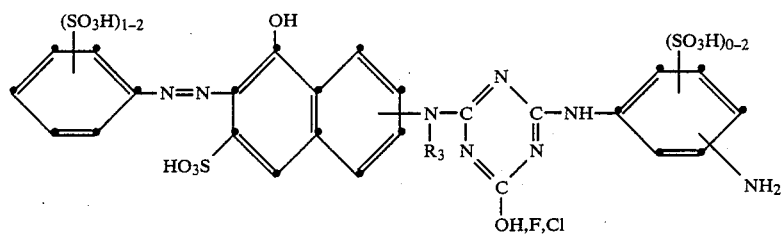
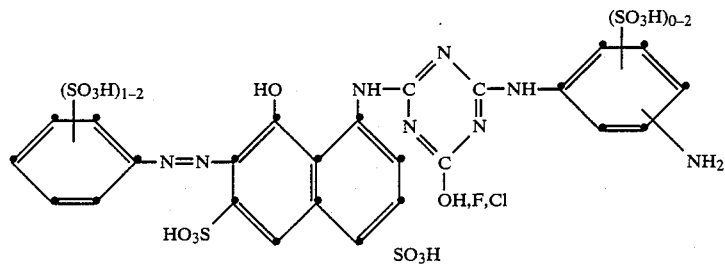
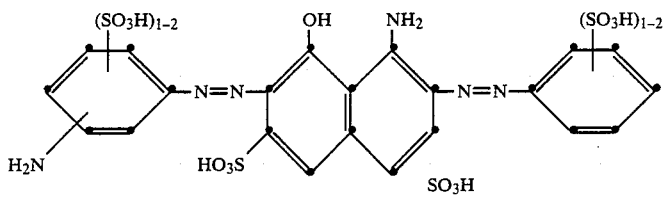
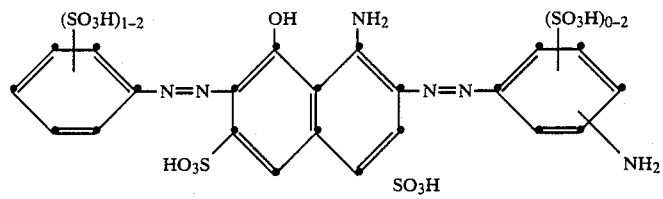

-continued
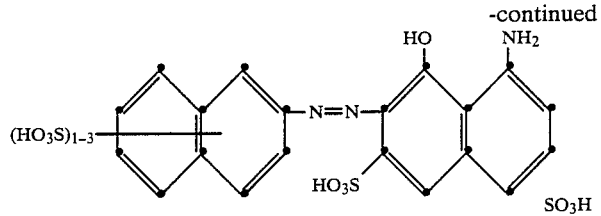
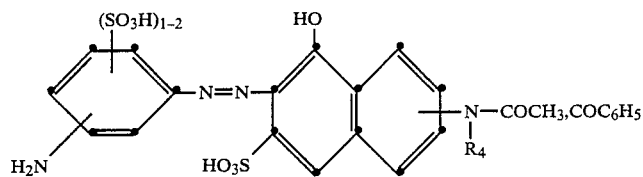
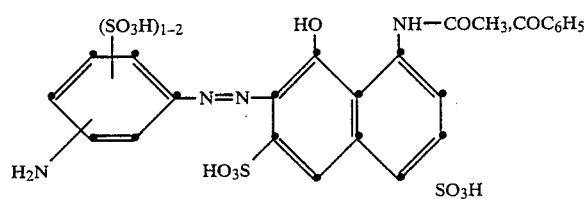
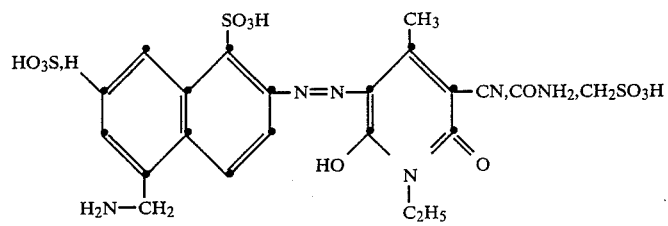
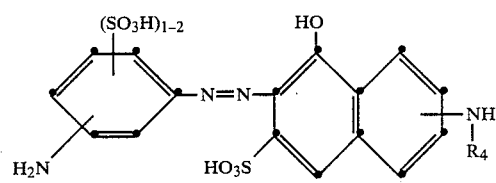
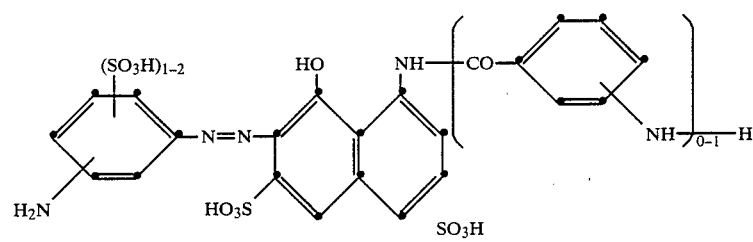
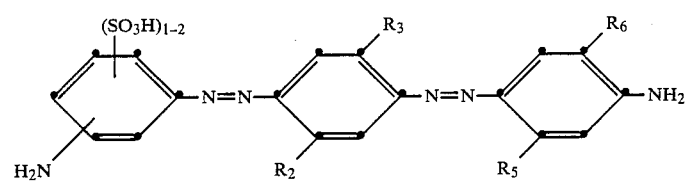
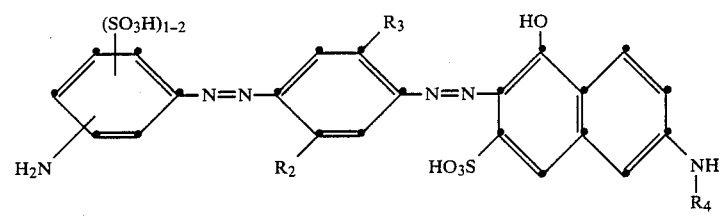

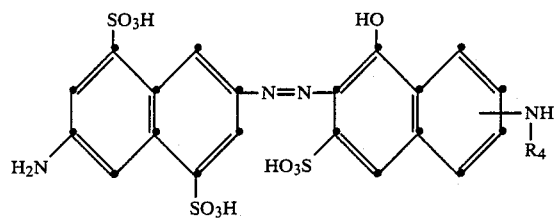
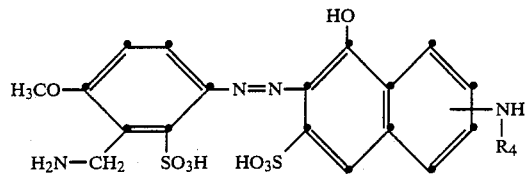
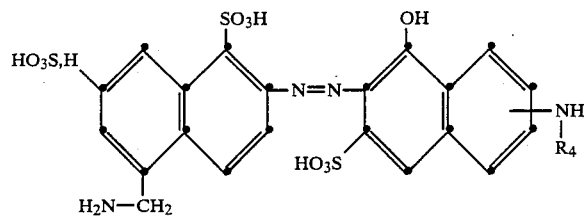
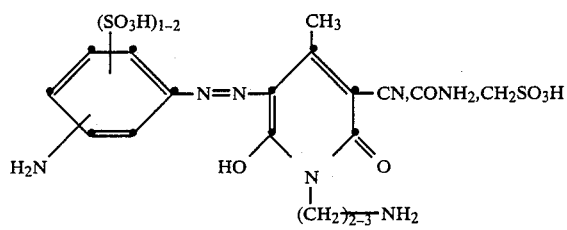
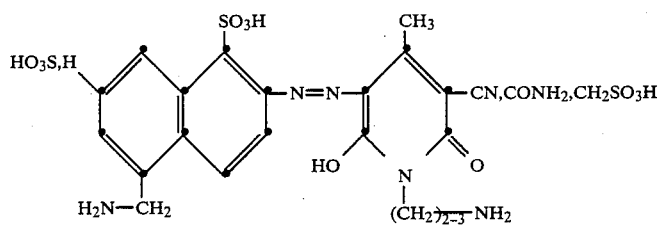
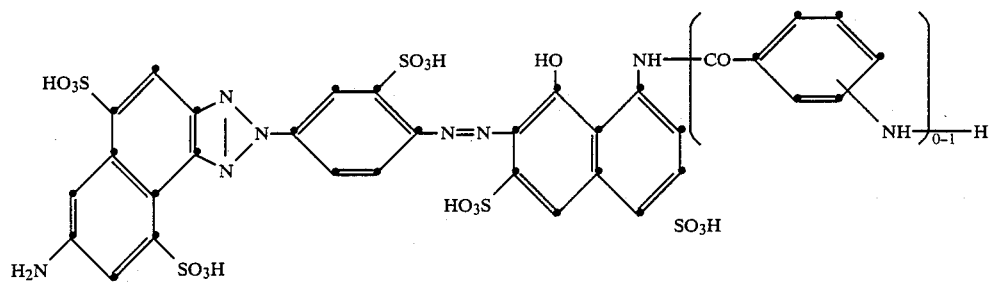
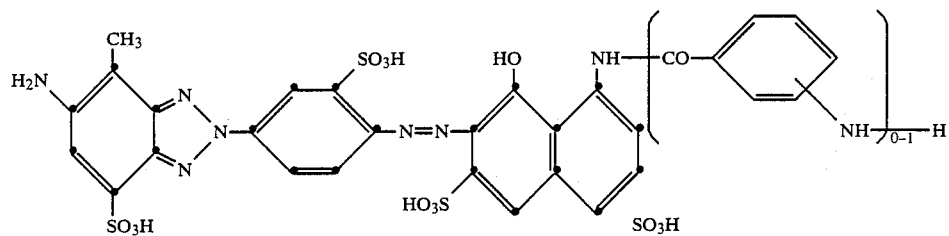

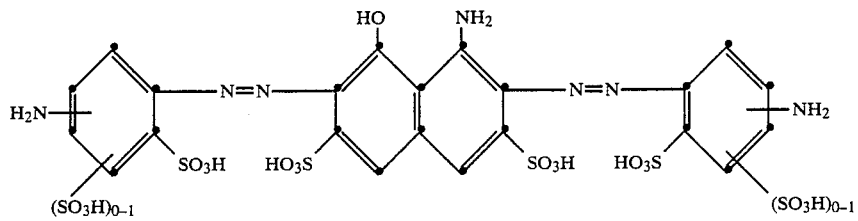

In the formulae shown above, $R_2$, $R_3$, $R_5$ and $R_6$ are independently of one another for example hydrogen, $C_1$-$C_4$alkyl, $C_1$-$C_4$alkoxy, $C_1$-$C_4$alkanoylamino, ureido or halogen, and $R_4$ is for example hydrogen or $C_1$-$C_4$alkyl.

(b) Metal complexes of monoazo or disazo dyes of the aforementioned formulae (4) or (5) which have groups capable of metal complex formation, for example hydroxyl, carboxyl, amino or sulfo:

where Fa in the formula (1) is the radical of a metal complex azo dye, this Fa can be derived for example from a metal complex of the following dyes:

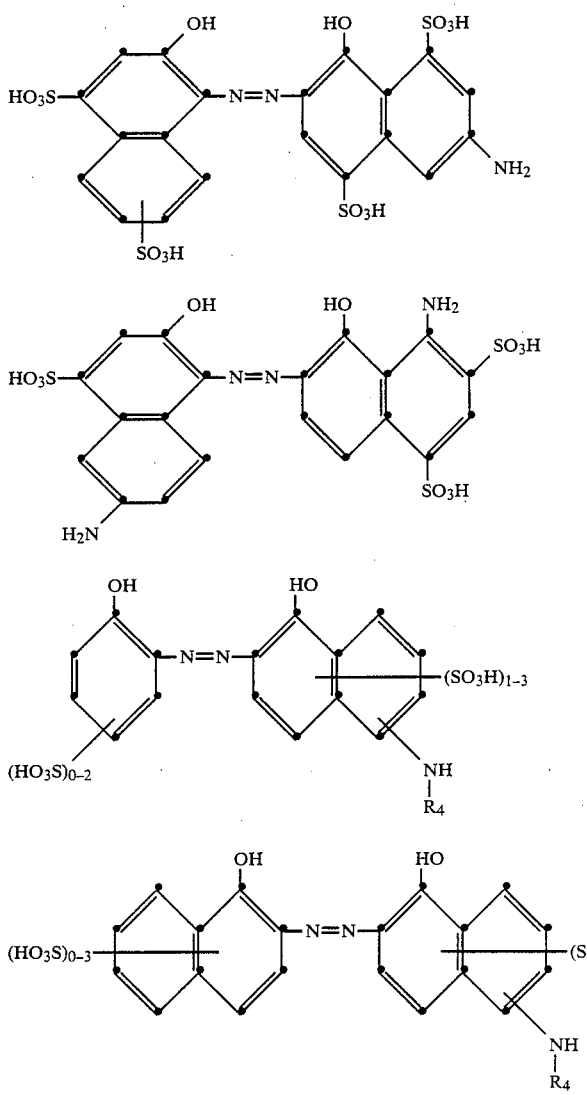

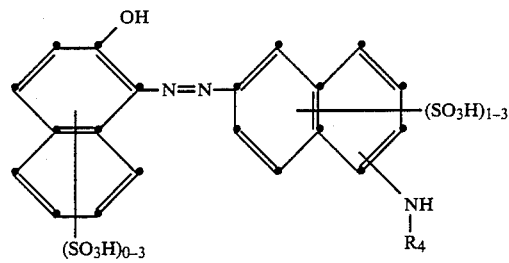

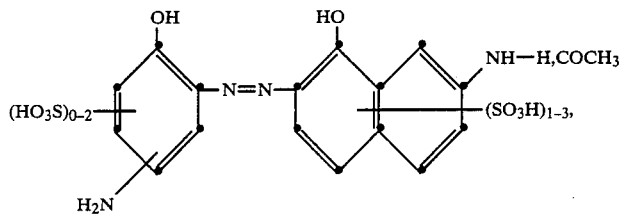

where R₄ is in each case as defined above.

Preferred metal atoms are Cu (1:1 complex) or Cr and Co (1:2 complex). Cr- and Co-complexes can contain the azo compound of the abovementioned formula once or twice, i.e. they can have a symmetrical structure or incorporate any other desired ligands and have an asymmetrical structure.

Examples of suitable copper complex dyes from which the radical Fa in the formula (1) can be derived are:

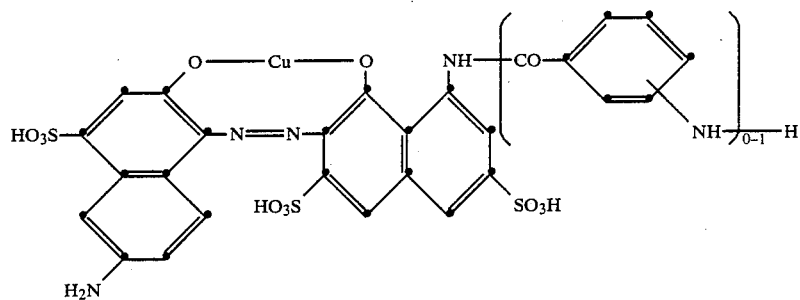

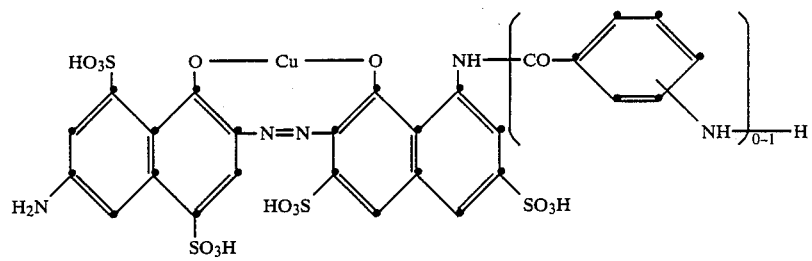

(c) anthraquinone dyes of the formula

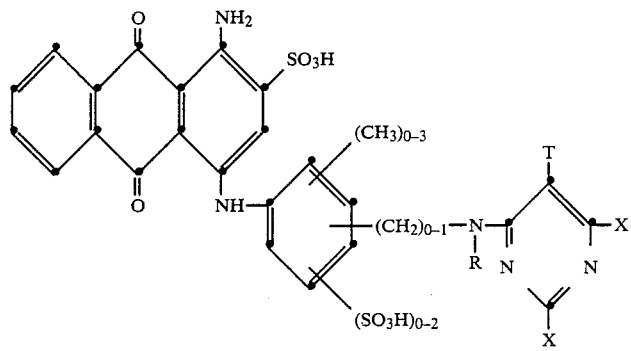
(6)

in which R, T and X are each as defined above.

(d) Formazan dyes of the formula

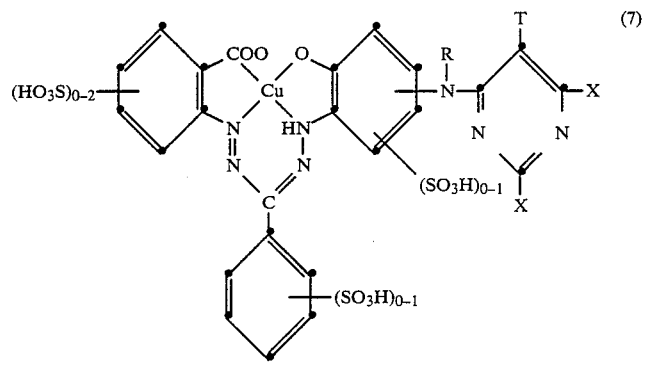
(7)

in which R, T and X are each as defined above.

(e) Phthalocyanine dyes of the formula

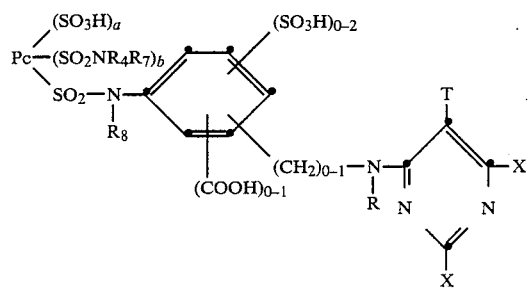
(8)

in which R, T and X are each as defined above, Pc is the radical of a Cu- or Ni-phthalocyanine, $R_4$, $R_7$ and $R_8$ are independently of one other $C_1$–$C_4$alkyl and in particular hydrogen and a and b are integral or fractional numbers from 1 to 3, a and b together being 3.0.

(f) Reactive dyes of the formula (1) in which Fa is for example a radical of a dioxazine dye of the formula

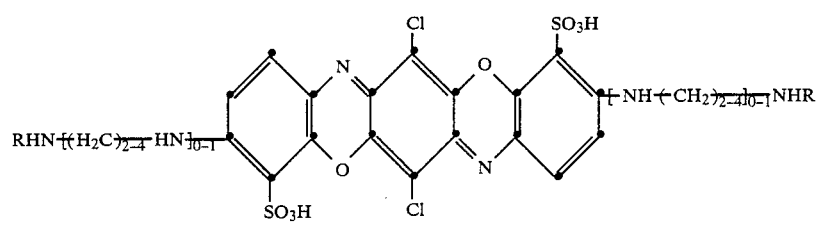
(9)

in which R is as defined above.

A particularly preferred embodiment of the present invention relates to reactive dyes of the aforementioned formula (1b) in which Fa is a radical of the formula

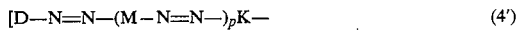
(4')

or

(5')

and

D, $D_1$, M, K, $K_1$ and p are each as defined under the formula (4) or (5).

Preference is given here in particular on the one hand to dyes of the formula (1b) in which Fa is a radical of the formula (4'), p is O, D is a radical of the formula

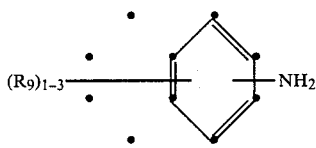

in which $R_9$ is 1 to 3 identical or different radicals selected from the group consisting of sulfo, aminomethyl, β-sulfatoethylsulfonyl and vinylsulfonyl, and K is the radical of 1-amino-8-hydroxynaphthalene-3,6- or -4,6-disulfonic acid, of 2-amino-5-hydroxynaphthalene-7-sulfonic acid or the radical of an unsubstituted or sulfo- or ureido-substituted aniline.

Particular preference is further given to those dyes of the formula (1b) in which Fa is a radical of the formula (5'), D is the radical of a sulfo-, β-sulfatoethylsulfonyl- and/or vinylsulfonyl-substituted aminobenzene, $D_1$ is an unsubstituted or sulfo-substituted radical of a diaminobenzene and $K_1$ is the radical of 1-amino-8-hydroxy-3,6- or -4,6-disulfonic acid.

In a further group of particularly useful reactive dyes of the formula (1b), Fa is a radical of the formula The reactive dyes according to the invention can be prepared for example by condensing organic dyes of the formula

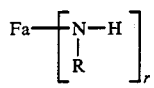

(10)

or dye precursors with at least one equivalent of a pyrimidine of the formula

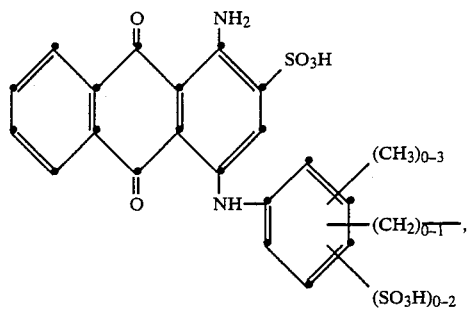

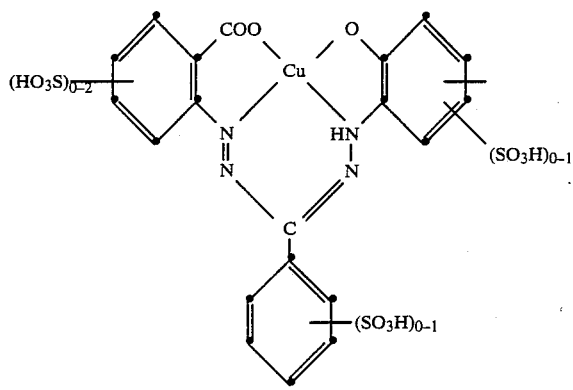

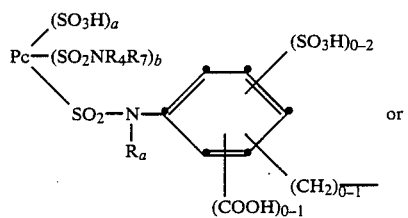

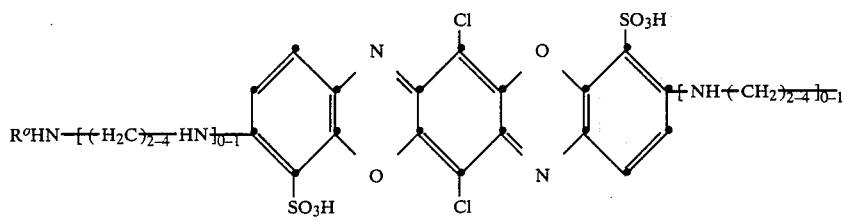

where Pc, $R_4$, $R_7$, $R_8$, a and b are each as defined above under the formula (9).

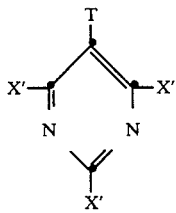

(11)

and at least one equivalent of an amine of the formula

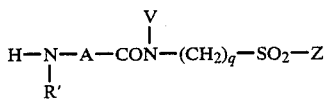

(2b)

or of the formula

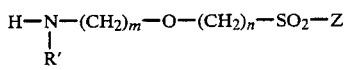

(3b)

in any desired order to give a reactive dye of the formula (1), Fa, R, R', T, A, V, Z, m, n, q and r each having as defined above and X' being defined in each case as a detachable substituent X, and, if dye precursors have been used, converting them into the desired final dyes.

Optionally, the process according to the invention is followed by a further conversion reaction. Where the final dyes are prepared from precursors the further conversion reaction comprises in particular couplings which lead to azo dyes. Since the individual process steps mentioned above can be carried out in various orders, different process variants are possible. In general, the reaction is carried out in successive steps, the order of the elementary reactions between the individual reaction components advantageously depending on the particular conditions. Since under certain conditions a halopyrimidine radical will become hydrolyzed, it is necessary to hydrolyze an acetylamino-containing intermediate, to remove the acetyl groups, before condensation with a halopyrimidine. Which reaction is advanageously carried out first in the preparation of a secondary condensation product of an amine of the formula (2b) or (3b), of the pyrimidine of the formula (11) and the organic dye of the formula (10) or a precursor, that of the pyrimidine with the amine or that with the organic dye or with a precursor thereof, will vary from case to case and will depend in particular on the solubility of the amino compounds involved and on the basicity of the amino groups to be acylated. A possible further conversion reaction is a subsequent reaction at the radical X'. If desired, detachable radicals X' can be replaced by other detachable radicals after the condensation of the pyrimidine of the formula (11) with a dye of the formula (10) or a dye precursor. For instance, a halogen atom can be replaced by another halogen atom through the action of a halogenating agent. The action of tertiary bases, such as trimethylamine, pyridine or 1,4-diazabicyclo[2.2.2]octane, gives corresponding ammonium compounds, and quaternization with hydrazines, such as N,N-dimethylhydrazine, gives corresponding hydrazinium compounds. By means of sulfites, for example sodium sulfite, and sulfinates it is possible to bring about a replacement of halogen by sulfo groups or a sulfonyl group, for example a 3'-carboxyphenylsulfonyl group and the like. By reaction with cyanides, for example potassium cyanide, and thiocyanates, for example potassium thiocyanate, it is possible to bring about a replacement of chlorine by a nitrile or thiocyanate group, which are likewise reactive. It is also possible to replace halogen atoms or other reactive groups through the action of sodium azide or compounds containing reactive methylene groups, for example cyanoacetic esters, malonic esters and acetylacetone, by the corresponding radicals. The replacement of a detachable substituent X' by another detachable substituent can in many cases also be carried out before the condensation of the pyrimidine of the formula (11) with a dye of the formula (10) or a dye precursor.

Furthermore, the synthesis can be followed by elimination reactions. For example, reactive dyes of the formula (1) which contain sulfatoethylsulfonyl radicals can be treated with hydrogen halide eliminators, such as sodium hydroxide, to convert the sulfatoethylsulfonyl radicals into vinylsulfonyl radicals.

A modified embodiment of the process comprises first preparing a dye which contains a preliminary stage of the reactive radical and subsequently converting this preliminary stage into the final stage, for example by esterification or an addition reaction. For example, a dye in which Z is an HO—$CH_2CH_2$— radical can be prepared and be reacted, before or after the acylation, with sulfuric acid, so that the hydroxyl group is converted into a sulfato group; or an analogous dye is used in which Z is an $H_2C$=CH— vinyl group, onto which thiosulfuric acid is added to form an $HO_3SS$—$CH_2CH_2$— radical. The sulfation of the hydroxyl group in a dye of the formula (1) or a suitable precursor is effected for example by reaction with concentrated sulfuric acid at 0° C. to moderately elevated temperature. The sulfation can also be effected by reaction of the hydroxy compound with two equivalents of chlorosulfonic acid per hydroxyl group in a polar organic solvent, for example N-methylpyrrolidone, at 10° to 80° C. Preferably, the sulfation is effected by introducing the compound in question into sulfuric acid monohydrate at temperatures between 5° and 15° C. The introduction of another radical Y which is detachable under alkaline conditions in a compound of the formula (1) or an intermediate in place of the sulfato group, for example a thiosulfato group, is effected in a manner known per se. The preparation by way of an intermediate stage of the reactive radical proceeds in many cases uniformly and to completion.

The process variant where the starting materials are dye precursors is suitable for preparing reactive dyes of the formula (1) in which Fa is the radical of a dye composed of two or more than two components. Examples of such dyes composed of two or more than two components are: monoazo, disazo, trisazo, metal complex azo, formazan and azomethine dyes. Generally, the reactive dyes of the formula (1) of all dye classes can be prepared in a manner known per se or analogously to known methods by starting from precursors of or intermediates for dyes which contain fibre-reactive radicals of formula (1) or by introducing these fibre-reactive radicals into intermediates of dye character which are suitable for this purpose.

If the starting materials are dye precursors, if the reaction dyes of the formula (1) are obtained for example by condensing a component of the dye of formula (10) containing an —N(R)H group and a pyrimidine of the formula (11), condensing beforehand or afterwards with an amine of the formula (2b) or (3b), and reacting with the other component of the dye of the formula (10). In the preparation of the preferred azo dyes, the diazo components and the coupling components together need to contain at least one amino group —N(R)H and in addition the diazo components need to contain an amino group —NH$_2$. In this case the diazo components used are in particular 1,3-phenylenediamine-4-sulfonic acid, 1,4-phenylenediamine-2-sulfonic acid, 1,4-phenylenediamine-2,5-disulfonic acid or 1,3-phenylenediamine-4,6-disulfonic acid. If desired, it is possible to use corresponding acetylamino or nitro compounds in which the acetylamino or nitro group is converted into the H$_2$N group, by hydrolysis and reduction respectively, before the condensation with the 2,4,6-trihalopyrimidine.

If groups capable of metal complex formation are present in the reactive dyes prepared, such as hydroxyl, carboxyl, amino or sulfo, the reactive dyes can subsequently also be metallized. For example, metal complex azo dyes are obtained by treating azo compounds which have been obtained according to the invention and which contain complexing groups, for example hydroxyl or carboxyl groups, in the ortho-ortho'-position relative to the azo bridge, with heavy metal donor agents before or if desired even after the condensation with the 2,4,6-trihalopyrimidine of the formula (10). Of particular interest are copper complexes of reactive dyes of the formula (1). In addition to the method of metallization mentioned above, other suitable methods are dealkylating metallization and, for the preparation of copper complexes, oxidative coppering.

The most important process variants as illustrated in the working examples.

The compounds of the formula (10) are known or can be prepared in a manner known per se. A selection of usable compounds of the formula (10) can be found in the discussion of the preferred subgroups of the reactive dyes according to the invention.

Similarly, the pyrimidine compounds of the formula (11) are known for example from EP-A-141,776 or DE-A-2,310,334.

Examples of suitable pyrimidine compounds of the formula (11) are: 2,4,5,6-tetrachloropyrimidine, 2,4,5,6-tetrafluoropyrimidine, 2,4,5,6-tetrabromopyrimidine, 2,4,6-trichloro-5-methylsulfinylpyrimidine, 2,4,6-trifluoro-5-methylsulfinylpyrimidine, 2,4,6-tribromo-5-methylsulfinylpyrimidine, 2,4,6-trichloro-5-ethylsulfinylpyrimidine, 2,4,6-trichloro-5-n-propylsulfinylpyrimidine, 2,4,6-trichloro-5-n-butylsulfinylpyrimidine, 2,4,6-trichloro-5-isopropylsulfinylpyrimidine, 2,4,6-trichloro-5-tert-butylsulfinylpyrimidine, 2,4,6-trichloro-5-methylsulfonylpyrimidine, 2,4,6-tribromo-5-methylsulfonylpyrimidine, 2,4,6-trifluoro-5-methylsulfonylpyrimidine, 2,4,6-trichloro-5-ethylsulfonylpyrimidine, 2,4,6-trichloro-5-isopropylsulfonylpyrimidine, 2,4,6-trichloro-5-n-butylsulfonylpyrimidine, 2,4,6-trichloro-5-chloromethylsulfonylpyrimidine, 2,4,6-trichloro-5-β-chloroethylsulfonylpyrimidine, 2,4,6-trichloro-5-trifluoromethylsulfonylpyrimidine, 2,4,6-trichloro-5-perfluorobutylsulfonylpyrimidine, 2,4,6-trichloro-5-ethoxymethylsulfonylpyrimidine, 2,4,6-trifluoro-5-ethoxyethylsulfonylpyrimidine, 2,4,6-tribromo-5-isopropoxymethylsulfonylpyrimidine, 2,4,6-trichloro-5-benzylsulfonylpyrimidine, 2,4,6-tribromo-5-benzylsulfonylpyrimidine, 2,4,6-trifluoro-5-benzylsulfonylpyrimidine, 2,4,6-trichloro-5-phenetylsulfonylpyrimidine, 2,4-dichloro-6-bromo-5-methylsulfonylpyrimidine, 2,4-dichloro-6-fluoro-5-methylsulfonylpyrimidine, 2,4-dichloro-6-fluoro-5-methylsulfonylpyrimidine, 2-chloro-4,6-difluoro-5-methylsulfonylpyrimidine, 2-chloro-4,6-dibromo-5-methylsulfonylpyrimidine, 2-bromo-4,6-difluoro-5-methylsulfonylpyrimidine, 2-chloro-4,6-difluoro-5-ethylsulfonylpyrimidine, 2,4,6-trichloro-5-carboxypyrimidine, 2,4,6-trifluoro-5-carboxypyrimidine, 2,4,6-trichloro-5-cyanopyrimidine, 2,4,6-trichloro-5-formylpyrimidine.

The compounds of the formula (2b) are known for exaple from EP-A-214,093 or can be prepared analogously thereto. Examples of suitable compounds of the formula (2b) are:

3-amino-N'-β-(β'-chloroethylsulfonyl)ethyl-benzamide,
4-chloro-3amino-N'-β-(β'-chloroethylsulfonyl)ethyl-benzamide,
4-methyl-3-amino-N'-β-(β'-chloroethylsulfonyl)ethyl-benzamide,
4-methoxy-3-amino-N'-β-(β'-chloroethylsulfonyl)ethyl-benzamide,
3-amino-N'-β-[β''-chloroethylsulfonyl)ethyloxy]ethyl-benzamide,
3-amino-N'-γ-(β'-chloroethylsulfonyl)propyl-benzamide,
3-amino-N'-bis[β-(β'-chloroethylsulfonyl)ethyl]-benzamide,
3-amino-N'-bis[γ-(β'-chloroethylsulfonyl)propyl]-benzamide,
3-N-ethylamino-N'-β-(β'-chloroethylsulfonyl)ethyl-benzamide,
3-N-isopropylamino-N'-β-(β'-chloroethylsulfonyl)ethyl-benzamide,
3-N-isopropylamino-N'-γ-(β'-chloroethylsulfonyl)propyl-benzamide,
4-amino-N'-β-(β'-chloroethylsulfonyl)ethyl-benzamide,
4-amino-N'-β-[β'-(β''-chloroethylsulfonyl)ethyloxy]ethyl-benzamide,
4-amino-N'-γ-(β'-chloroethylsulfonyl)propyl-benzamide,
4-amino-N'-bis[β-(β'-chloroethylsulfonyl)ethyl]-benzamide,
4-amino-N'-bis[γ-β'-chloroethylsulfonyl)propyl]-benzamide,
4-N-ethylamino-N'-β-(β'-chloroethylsulfonyl)ethyl-benzamide, 4-N-isopropylamino-N'-γ-(β'-chloroethylsulfonyl)propyl-benzamide,
4-amino-N'-β-(vinylsulfonyl)ethyl-benzamide,
4-amino-N'-bis[β-(vinylsulfonyl)ethyl]-benzamide,
4-amino-N'-δ-(β'-chloroethylsulfonyl)butyl-benzamide,
4-chloro-3-amino-N'-bis[β-(β'-chloroethylsulfonyl)ethyl-benzamide,
4-methyl-3-amino-N'-bis[β-(β'-chloroethylsulfonyl)ethyl-benzamide,
4-methoxy-3-amino-N'-bis[γ-(β'-chloroethylsulfonyl)propyl]-benzamide,
3-amino-N'-δ-(β'-chloroethylsulfonyl)butyl-benzamide,
3-amino-N'-β-[β'-(β''-chloroethylsulfonyl)ethyloxy]ethyl-benzamide,
4-hydroxy-3-amino-N'-β-(β'-chloroethylsulfonyl)ethyl-benzamide,
4-hydroxy-3-amino-N'-bis[β-(β'-chloroethylsulfonyl)ethyl]-benzamide,
4-methoxy-3-amino-N'-bis[β-(β'-chloroethylsulfonyl)ethyl-benzamide.

The compounds of the formula (3b) are known for example from EP-A-144,766 or can be prepared analogously thereto.

The reactive dyes of the formula (1) according to the invention are suitable for dyeing and printing a very wide range of materials, such as silk, leather, wool, polyamide fibres, and in particular cellulose-containing fibre materials of any kind. Such fibre materials are for example the natural cellulose fibres, such as cotton, linen and hemp, and also cellulose pulp and regenerated cellulose. The reactive dyes according to the invention are also suitable for dyeing or printing hydroxyl-containing fibres which are present in blend fabrics, for example mixtures of cotton with polyester fibres or polyamide fibres.

The dyes of the formula (1) can be applied to the fibre material and fixed on the fibre in various ways, in particular in the form of aqueous dye solutions and print pastes. They are suitable not only for the exhaustion method of dyeing but also for dyeing by the padding method, whereby the material is impregnated with aqueous, optionally salt-containing, dye solutions and the dyes are fixed after an alkali treatment or in the presence of alkali, optionally by heating. They are likewise suitable for the cold pad-batch process, whereby the dye is applied together with the alkali on a pad-mangle and is then fixed by storing for several hours at room temperature. After fixing, the dyeings or prints are thoroughly rinsed with cold and hot water, in the presence or absence of an agent which has a dispersing action and promotes the diffusion of the unfixed portions.

The reactive dyes of the formula (1) are distinguished by high reactivity and good fixing properties and very good build-up. They can therefore be used for exhaustive dyeing at low dyeing temperatures and require only short steaming times in the pad-steam process. The degrees of fixation are high, and the unfixed portions can easily be washed off, the difference between the degree of exhaustion and the degree of fixation being remarkably small, i.e. the soaping loss being very small.

The reactive dyes according to the invention are also suitable for printing, in particular on cotton, but also for printing on nitrogen-containing fibres, for example wool, silk or wool- or silk-containing blend fabrics.

The dyeings and prints prepared with the dyes of the formula (1) according to the invention on cellulose fibre materials have a high tinctorial strength and high fibre-dye bond stability, not only in the acid but also in the alkaline range, and also a good light fastness and very good wet fastness properties, such as wash, water, seawater, cross-dyeing and perspiration fastness properties, and also a good pleating fastness, hot press fastness and rub fastness.

The Examples which follow serve to illustrate the invention. The temperatures are given in degrees Celsius, and parts and percentages are by weight, unless otherwise stated. Parts by weight relate to parts by volume as the kilogram relates to the liter.

EXAMPLE 1

A neutral solution of 25.3 parts of the amino azo dye of the formula

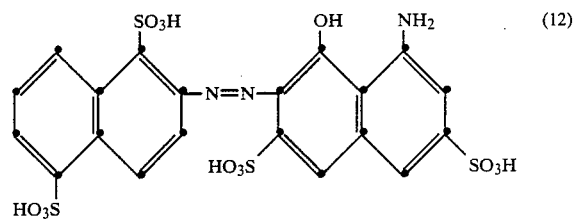

in 500 parts of water is admixed at room temperature with thorough stirring with 10.5 parts of 2,4,6-trichloro-5-methylsulfonylpyrimidine dissolved in 40 parts of acetone, and stirring is continued at that temperature for about 16 to 20 hours. The reaction solution is then brought to pH 7 with 1N sodium hydroxide solution and clarified by filtration. The dye of the formula

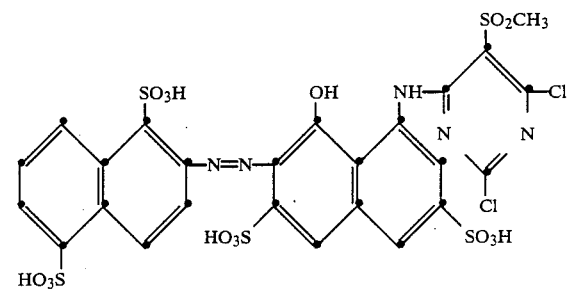

is then salted out and filtered off. The dye paste thus obtained is dissolved in 500 parts of water and gradually admixed with a solution of 13.1 parts of the hydrochloride of 1-amino-3-[β-(β'-chloroethylsulfonyl)ethylaminocarbonyl]benzene in 60 parts of water, the pH of the solution being maintained at about 7.0 with 1N sodium hydroxide solution.

The solution of the resulting dye of the formula

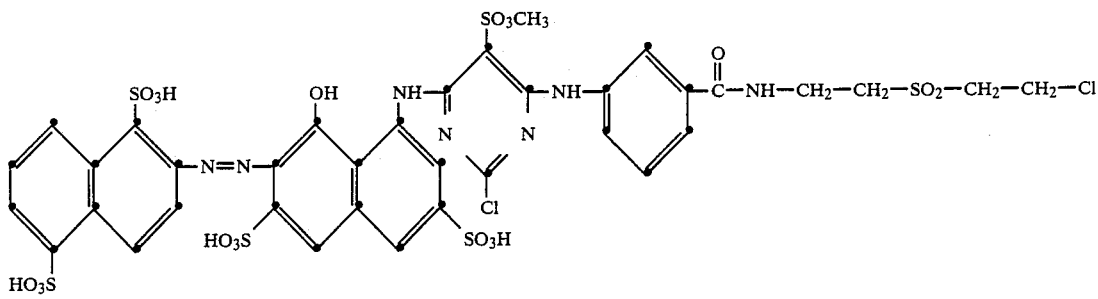

is then brought to pH 11 with 1N sodium hydroxide solution and subsequently maintained at room temperature for about 40 minutes, during which the dye is converted into the vinyl form. The pH is brought back to 7 with hydrochloric acid, and the dye of the formula

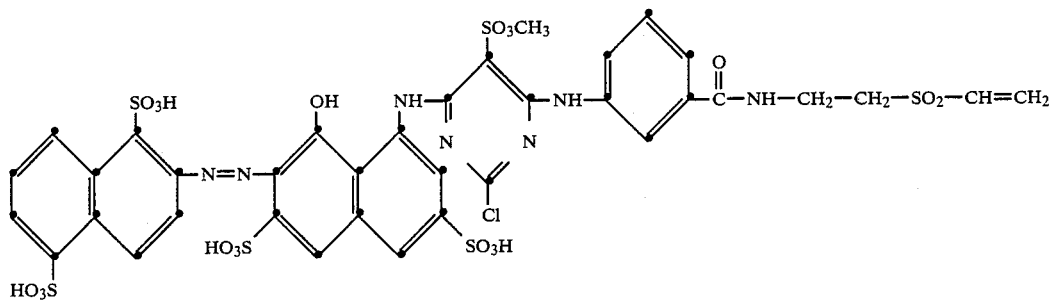

is isolated with potassium chloride and dried in vacuo.

The dye obtained, on application to cotton by the dyeing methods customary for vinyl sulfone dyes, produces bluish red dyeings having good all-round fastness properties: $\lambda_{max} = 530$ nm.

EXAMPLES 2-13

Example 1 is repeated, except that the dye of the formula (12) is replaced by the dyes mentioned in Table 1, affording analogous dyes which dye cotton in the hues given in the table.

TABLE 1

| Example No. | Dye | $\lambda_{max}$ [nm] | Hue on cotton |
|---|---|---|---|
| 2 | ![dye structure] | 381 | yellow |
| 3 | ![dye structure] | 408 | yellow |

TABLE 1-continued

| Example No. | Dye | λ$_{max}$ [nm] | Hue on cotton |
|---|---|---|---|
| 4 | naphthalene with SO$_3$H, HO$_3$S, SO$_3$H substituents, linked via –N=N– to phenyl with NH$_2$ and NH–CONH$_2$ | 420 | yellow |
| 5 | HO$_3$S–H$_2$C–C(=N–C$_2$H$_5$,O)–C(CH$_3$)=C(OH)–N=N–phenyl(SO$_3$H, NH$_2$, SO$_3$H) | 430 | yellow |
| 6 | naphthalene(SO$_3$H, SO$_3$H)–N=N–naphthalene(OH, HO$_3$S, NH$_2$) | 488 | orange |
| 7 | naphthalene(SO$_3$H, CH$_2$–NH$_2$)–N=N–naphthalene(OH, HO$_3$S, SO$_3$H, NH–CO–phenyl) | 548 | red |
| 8 | HO$_3$S–phenyl–N=N–naphthalene(NH$_2$, OH, HO$_3$S, SO$_3$H)–N=N–phenyl(NH$_2$, SO$_3$H) | 596 | navy |
| 9 | phenyl(HO$_3$S, HO$_3$S)–N=N–naphthalene(NH$_2$, OH, HO$_3$S, SO$_3$H)–N=N–phenyl(NH$_2$, SO$_3$H) | 610 | navy |
| 10 | naphthalene(SO$_3$H, SO$_3$H)–N=N–naphthalene(NH$_2$, OH, HO$_3$S, SO$_3$H)–N=N–phenyl(NH$_2$, SO$_3$H) | 610 | navy |

TABLE 1-continued

| Example No. | Dye | $\lambda_{max}$ [nm] | Hue on cotton |
|---|---|---|---|
| 11 | (Cu-complex azo dye structure with HO3S, COO, NH2, O, N=N, HN-N, C, Cl, SO3H, HO3S substituents) | 608 | blue |
| 12 | (Cu-complex azo dye structure with SO3H, O, OOC, NH2, HO3S, N=N, HN-N, C, SO3H substituents) | 596 | blue |
| 13 | (structure: H2N-C6H2(SO3H)-O-C6Cl2-N=... with two Cl, N, O bridging to another aryl-NH2, SO3 group) (only one amino group is made to react) | 558 | blue |
| 14 | (anthraquinone dye with NH2, SO3H, NH-aryl(CH3)3 with NH2 and SO3H) | 586 | blue |
| 15 | H2C—H2C—O2S—(C6H4)—N=N—(naphthalene with OH, NH2, HO3S, SO3H), OSO3H on ethyl chain | 524 | red |

TABLE 1-continued

| Example No. | Dye | $\lambda_{max}$ [nm] | Hue on cotton |
|---|---|---|---|
| 16 | | 608 | navy |
| 17 | | 608 | navy |

EXAMPLE 18

16.4 parts of the dye of the formula (13)

are dissolved in 300 parts of water, and the solution is cooled down to 0°–5° C. At that temperature, a solution of 6.4 parts of 2,4,6-trifluoro-5-methylsulfonylpyrimidine in 50 parts of acetone is added with thorough stirring while the pH is maintained at about 7.0 by dropwise addition of 1N sodium hydroxide solution.

After the reaction has ended, the reaction solution is admixed with a solution of 9.8 parts of the hydrochloride of 1-amino-3-[β-(β'-chlorosulfonyl)ethylaminocarbonyl]benzene, the pH of the solution being maintained at about 7.0 with 1N sodium hydroxide solution.

The aqueous solution of the dye obtained is then vinylated at room temperature and pH 11 for about 40 minutes. The pH is then brought back to 7.0 with hydrochloric acid, and the dye of the formula

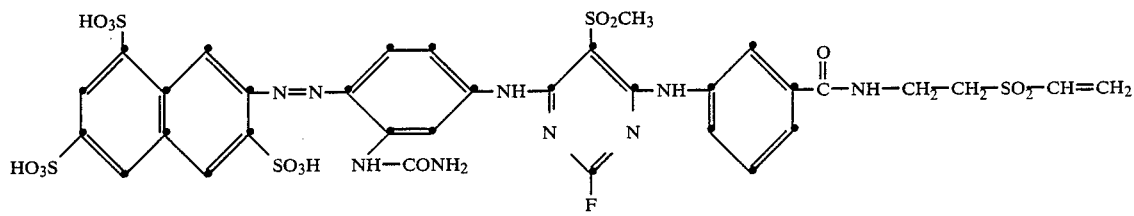

is salted out with potassium chloride, filtered off and dried in vacuo. The dye obtained, on application to cotton by methods customary for vinyl sulfone dyes, produces golden yellow dyeings having good all-round fastness properties. $\lambda_{max}=422$ nm.

EXAMPLE 19

Example 18 is repeated, except that the dye of the formula (13) is replaced by 16.6 parts of the dye of the formula

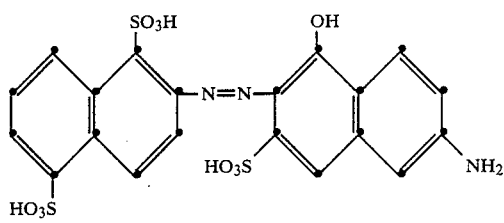

affording the dye of the formula

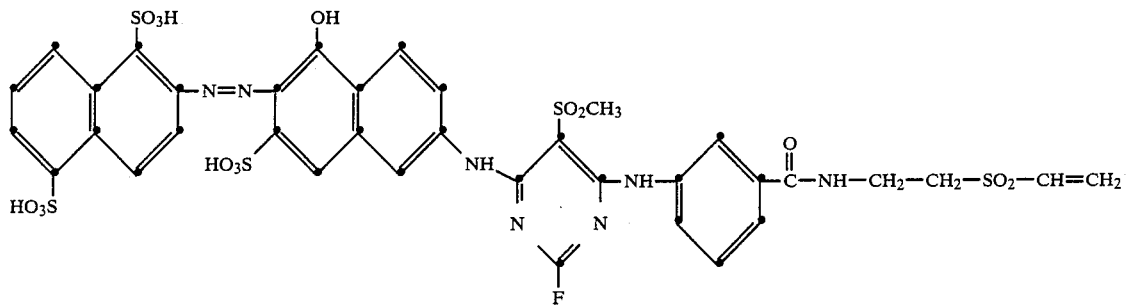

which dyes cotton in an orange shade having good fastness properties. $\lambda_{max}=488$ nm.

EXAMPLE 20

A neutral solution of 28.1 parts of a disazo dye of the formula

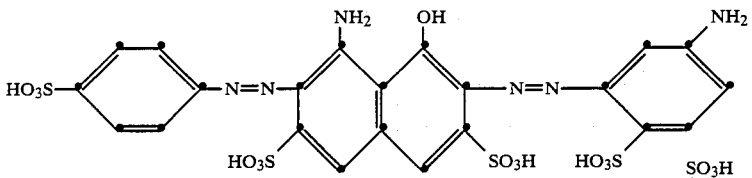

in 600 parts of water is admixed at room temperature with thorough stirring with a solution of 8.4 parts of 2,4,6-trichloro-5-cyanopyrimidine in 40 parts of acetone, and stirring is continued at that temperature for about 16–20 hours. The pH of the solution is then brought back to 7.0 with 1N sodium hydroxide solution, and the solution is clarified by filtration. To the dye solution is then added dropwise a solution of 13.1 parts of the hydrochloride of 1-amino-3-[β-(β′-chloroethylsulfonyl)ethylaminocarbonyl]benzene in 50 parts of water, the pH of the reaction mixture being maintained at about 7.0 with 1N sodium hydroxide solution.

The aqueous solution of the dye obtained is vinylated at room temperature and pH 11 for about 40 minutes. The pH is then brought back to 7.0 with hydrochloric acid, the dye of the formula

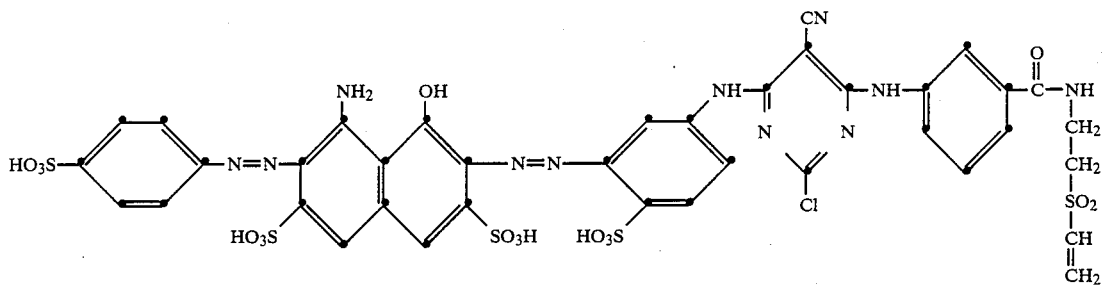

is precipitated by addition of potassium chloride, filtered off and dried in vacuo. The dye thus obtained dyes cotton in a navy shade having good allround fastness properties. $\lambda_{max}=596$ nm.

EXAMPLE 21

13.6 parts of the aminoazo dye of the formula

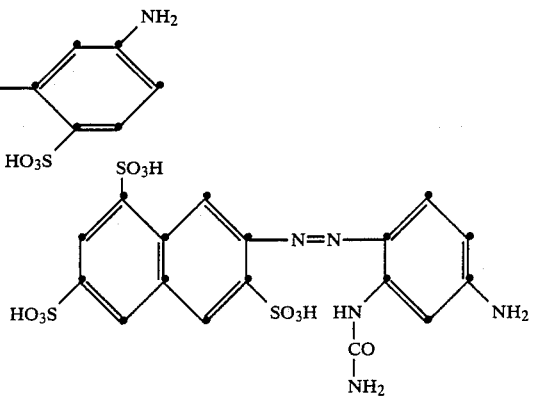

are dissolved in 150 ml of water under neutral conditions and is acylated at pH 6–6.5 and at a temperature of 0°–5° C. with a solution of 6 g of 2,4,6-trichloro-5-formylpyrimidine in 25 ml of acetone; in the course of the acylation the pH is maintained at 6–6.5 by dropwise addition of 2N sodium hydroxide solution. The dye solution is then clarified by filtration and reacted at pH 5.0–5.5 and at a temperature of 25° C. with a solution of 8.6 parts of the hydrochloride of 1-amino-3-[β-(β′-chloroethylsulfonyl)ethylaminocarbonyl]benzene in 150 ml of water. The pH is then adjusted to 10 with 2N sodium hydroxide solution, and vinylation is effected for 20 minutes. The dye is salted out with potassium chloride, filtered off and dried at 30° C. in vacuo. The dye thus obtained has the formula

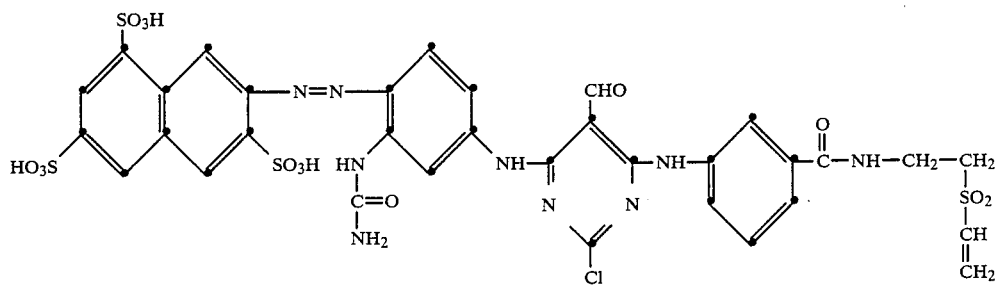
and dyes cotton in golden yellow shades ($\lambda_{max}$ 424 nm).
EXAMPLES 22-38
Example 21 is repeated, except that the aminoazo dye used therein is replaced by the dyes mentioned in Table 2, affording analogous dyes which dye cotton in the hues given in the table.
TABLE 2
| Example No. | Dye | $\lambda_{max}$ [nm] | Hue on cotton |
|---|---|---|---|
| 22 | | 528 | bluish red |
| 23 | | 381 | yellow |
| 24 | | 408 | yellow |
| 25 | | 430 | yellow |

TABLE 2-continued

| Example No. | Dye | $\lambda_{max}$ [nm] | Hue on cotton |
|---|---|---|---|
| 26 | (naphthalene with SO₃H and SO₃H)—N=N—(naphthalene with OH, HO₃S, NH₂) | 488 | orange |
| 27 | (naphthalene with SO₃H and CH₂—NH₂)—N=N—(naphthalene with OH, HO₃S, SO₃H, NH—CO—phenyl) | 548 | red |
| 28 | HO₃S—(phenyl)—N=N—(naphthalene with NH₂, OH, HO₃S, SO₃H)—N=N—(phenyl with NH₂, SO₃H) | 596 | navy |
| 29 | HO₃S, HO₃S—(phenyl)—N=N—(naphthalene with NH₂, OH, HO₃S, SO₃H)—N=N—(phenyl with NH₂, SO₃H) | 610 | navy |
| 30 | (naphthalene with SO₃H and SO₃H)—N=N—(naphthalene with NH₂, OH, HO₃S, SO₃H)—N=N—(phenyl with NH₂, SO₃H) | 597 | navy |
| 31 | Cu complex dye structure with HO₃S, COO, NH₂, O, HN, SO₃H, Cl, HO₃S | 608 | blue |

TABLE 2-continued

| Example No. | Dye | $\lambda_{max}$ [nm] | Hue on cotton |
|---|---|---|---|
| 32 | (Cu complex dye structure with SO₃H, HO₃S, NH₂, COO, HN, N=N, and sulfonated phenyl groups) | 596 | blue |
| 33 | (Dye structure with H₂N, SO₃H, Cl, O, N substituted quinone-diimine linked to aminosulfonated phenyl) (only one amino group is made to react) | 588 | blue |
| 34 | (Anthraquinone dye with NH₂, SO₃H, and trimethyl-amino-sulfonated phenylamino substituent) | 586 | blue |
| 35 | (Azo dye: H₂C—H₂C—O₂S—phenyl—N=N—naphthalene(OH)(NH₂)(HO₃S)(SO₃H) with O—SO₃H) | 524 | red |
| 36 | (Bis-azo dye with O₂S-CH₂CH₂-O-SO₃H group, phenyl-N=N-naphthol(NH₂)(HO₃S)(SO₃H)-NH=N-phenyl(NH₂)(HO₃S)(SO₃H)) | 604 | navy |
| 37 | (Bis-azo dye with CH=CH₂ vinyl phenyl-N=N-naphthol(NH₂)(HO₃S)(SO₃H)-N=N-phenyl(NH₂)(HO₃S)) | 610 | navy |

EXAMPLE 38

Example 21 is repeated, except that 1-amino-3-[β-(β'-chloroethylsulfonyl)ethylaminocarbonyl]benzene is replaced by the equivalent amount of 1-amino-4-[β-(β'-chloroethylsulfonyl)ethylaminocarbonyl]benzene, affording the dye of the formula

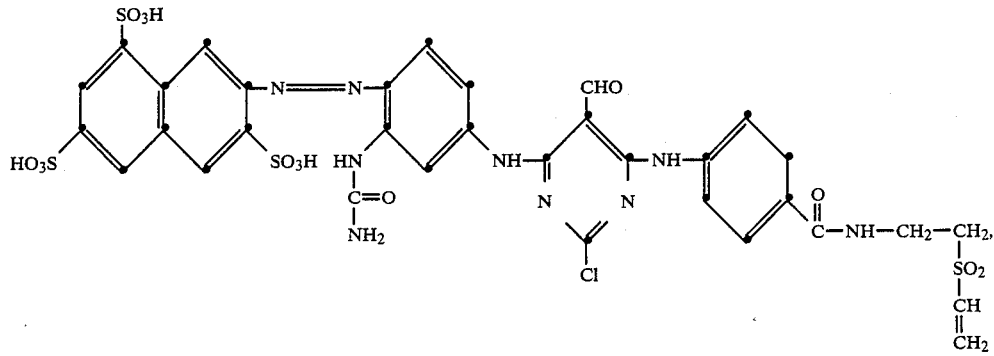

which likewise dyes cotton in golden yellow shades ($\lambda_{max}$ 420 nm).

DYEING METHOD I 2 parts of the reactive dye obtained in Example 1 are dissolved in 400 parts of water; to this solution are added 1,500 parts of a solution which contains per liter 53 g of sodium chloride. 100 parts of a cotton fabric are introduced at 40° C. into this dyebath. After 45 minutes 100 parts of a solution which contains per liter 16 g of sodium hydroxide and 20 g of calcined sodium carbonate are added. The temperature of the dyebath is held at 40° C. for a further 45 minutes. The dyed fabric is then rinsed, is soaped off at the boil with a nonionic detergent for a quarter of an hour, is rinsed once more and is dried.

DYEING METHOD II 2 parts of the reactive dye obtained in Example 5 are dissolved in 400 parts of water; to this solution are added 1,500 parts of a solution which contains per liter 53 g of sodium chloride. 100 parts of a cotton fabric are introduced at 35° C. into this dyebath. After 20 minutes 100 parts of a solution which contains per liter 16 g of sodium hydroxide and 20 g of calcined sodium carbonate are added. The temperature of the dyebath is held at 35° C. for a further 15 minutes. The temperature is then raised to 60° C. in the course of 20 minutes. The temperature is held at 60° C. for a further 35 minutes. The fabric is then rinsed, is soaped off at the boil with a nonionic detergent for a quarter of an hour, is rinsed once more and is dried.

DYEING METHOD III 8 parts of the reactive dye obtained in Example 6 are dissolved in 400 parts of water; to this solution are added 1,400 parts of a solutiou which contains per liter 100 g of sodium sulfate. 100 parts of a cotton fabric are introduced at 25° C. into this dyebath. After 10 minutes 200 parts of a solution which contains per liter 150 g of trisodium phosphate are added. The temperature of the dyebath is then raised to 60° C. in the course of 10 minutes. The temperature is held at 60° C. for a further 90 minutes. The fabric is then rinsed, is soaped off at the boil with a nonionic detergent for a quarter of an hour, is rinsed once more and is dried.

DYEING METHOD IV 4 parts of the reactive dye obtained in Example 7 are dissolved in 50 parts of water. To this solution are added 50 parts of a solution which contains per liter 5 g of sodium hydroxide and 20 g of calcined sodium carbonate. The resulting solution is applied to a cotton fabric on a pad-mangle in such a way that its weight increases by 70%, and the fabric is then wound onto a beam. In this state the cotton fabric is left to stand at room temperature for 3 hours. The dyed fabric is then rinsed, is soaped off at the boil with a nonionic detergent for a quarter of an hour, is rinsed once more and is dried.

DYEING METHOD V 6 parts of the reactive dye obtained in Example 9 are dissolved in 50 parts of water. To this solution are added 50 parts of a solution which contains per liter 16 g of sodium hydroxide and 0.04 liter of 38° Bé sodium silicate. The resulting solution is applied to a cotton fabric on a pad-mangle in such a way that its weight increases by 70%, and the fabric is then wound onto a beam. In this state the cotton fabric is left at room temperature for 10 hours. The dyed fabric is then rinsed, is soaped off at the boil with a nonionic detergent for a quarter of an hour, is rinsed once more and is dried.

DYEING METHOD VI 2 parts of the reactive dye obtained in Example 14 are dissolved in 100 parts of water with the addition of 0.5 part of sodium n-nitrobenzenesulfonate. The resulting solution is used to impregnate a cotton fabric in such a way that its weight increases by 75%, and the fabric is then dried. The fabric is then impregnated with a warm solution at 20° C. which contains per liter 4 g of sodium hydroxide and 300 g of sodium chloride, and is squeezed to a 75% weight increase and the dyeing is steamed at 100° to 102° C. for 30 seconds, is rinsed, is soaped off at the boil with a 0.3% strength solution of a nonionic detergent for a quarter of an hour, is rinsed and is dried.

PRINTING METHOD I 3 parts of the reactive dye obtained in Example 12 are sprinkled with high-speed stirring into 100 parts of stock thickening containing 50 parts of 5% strength sodium alginate thickening, 27.8 parts of water, 20 parts of urea, 1 part of sodium m-nitrobenzenesulfonate and 1.2 parts of sodium hydrogencarbonate. The print paste thus obtained is used to print a cotton fabric which is then dried, and the resulting printed fabric is steamed at 102° C. in saturated steam for 2 minutes.

The printed fabric is then rinsed, if desired soaped off at the boil and rinsed once more, and is then dried.

PRINTING METHOD II 5 parts of the reactive dye obtained in Example 7 are sprinkled with high-speed stirring into 100 parts of a stock thickening containing 50 parts of 5% strength sodium alginate thickening, 36.5 parts of water, 10 parts of urea, 1 part of sodium m-nitrobenzenesulfonate and 2.5 parts of sodium hydrogencarbonate. The print paste thus obtained, whose stability meets industrial requirements, is used to print a cotton fabric, which is then dried, and the resulting printed fabric is steamed at 102° C. in saturated steam for 8 minutes. The printed fabric is then rinsed, optionally soaped off at the boil and rinsed once more, and is then dried.

What is claimed is:

1. A reactive dye of the formula

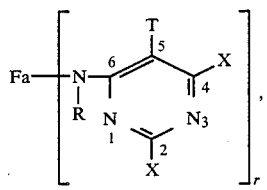   (1)

in which Fa is a monoazo, polyazo, metal complex azo, formazan or dioxazine dye radical, T is $C_1$-$C_4$alkylsulfonyl or $C_1$-$C_4$-alkanoyl, one X is halogen and the other X is a group of the formula

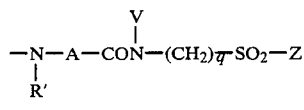   (2)

or the formula

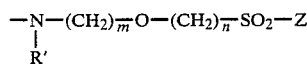   (3)

A is arylene,
V is hydrogen, $C_1$-$C_4$alkyl unsubstituted or substituted by halogen, hydroxyl, cyano, carboxyl, sulfo, sulfato, $C_1$-$C_4$alkoxycarbonyl of $C_1$-$C_4$alkoxy or a radical of the formula $-(CH_2)_q-SO_2-Z$,
Z is a $-CH=CH_2$ or $-CH_2-CH_2-Y$ radical and Y is $-OSO_3H$, $-SSO_3H$, $-OCOCH_3$, $-OPO_3H_2$, $-O-CO-C_6H_5$ or Cl,
q, m and n are independently of one another an integral number from 2 to 6, R and R' are independently of one another hydrogen or $C_1$-$C_4$alkyl unsubstituted or substituted by halogen, hydroxyl, cyano, carboxyl, sulfo, sulfato, $C_1$-$C_4$-alkoxycarbonyl or $C_1$-$C_4$-alkoxy, and r is 1 or 2.

2. A reactive dye according to claim 1, in which r is 1.

3. A reactive dye according to claim 1, in which T is methylsulfonyl, ethylsulfonyl or formyl.

4. A reactive dye according to claim 3, in which T is methylsulfonyl.

5. A reactive dye according to claim 3, in which T is formyl.

6. A reactive dye according to claim 1, in which the detachable substituent X is chlorine or fluorine.

7. A reactive dye according to claim 1, in which R and R' are independently of one another hydrogen, methyl or ethyl.

8. A reactive dye according to claim 1, in which Fa is unsubstituted or substituted by $C_1$-$C_4$alkyl, $C_1$-$C_4$alkoxy, $C_1$-$C_4$-alkanoylamino, benzoylamino, amino, unsubstituted or $-OH$, $-OCOCH_3$, $-OSO_3H$, $-CN$ or halogen substituted in the alkyl moiety, N-mono- or N,N-di-$C_1$-$C_4$alkylamino, phenylamino, mono- or disulfobenzylamino, $C_1$-$C_4$alkoxycarbonyl, $C_1$-$C_4$alkylsulfonyl, trifluoromethyl, nitro, cyano, halogen, carbamoyl, N-mono- or N,N-di-$C_1$-$C_4$alkylcarbamoyl, sulfamoyl, N-mono- or N,N-di-$C_1$-$C_4$-alkylsulfamoyl, N-mono- or N,N-di-($\beta$-hydroxyethyl)sulfamoyl, N-phenylsulfamoyl, hydroxyl, carboxyl, sulfo, sulfomethyl or ureido.

9. A reactive dye according to claim 1, in which Fa is a monoazo or disazo dye radical which is substituted by one or more radicals selected from the group consisting of methyl, ethyl, methoxy, ethoxy, acetylamino, benzoylamino, amino, chlorine, bromine, ureido, hydroxyl, carboxyl, sulfomethyl and sulfo.

10. A reactive dye according to claim 1, in wich one X is chlorine or fluorine and the other X is a group of the formula

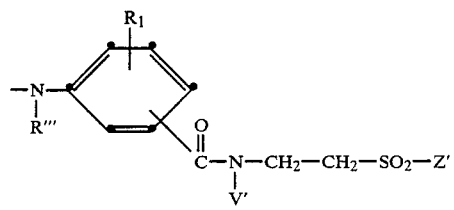   (2a)

or of the formula

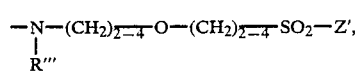   (3a)

in which R''' and V' are independently of one another hydrogen or $C_1$-$C_4$-alkyl, $R_1$ is hydrogen, sulfo, ureido, chlorine, methyl, ethyl, methoxy, ethoxy, hydroxyl or carboxyl, Z' is a $-CH=CH_2$ or $-CH_2-CH_2-Y'$ group, and Y' is $-OSO_3H$, $-SSO_3H$, $-OCOCH_3$, $-OPO_3H_2$, $-Cl$ or $-OCO-C_6H_5$.

11. A reactive dye according to claim 1, of the formula

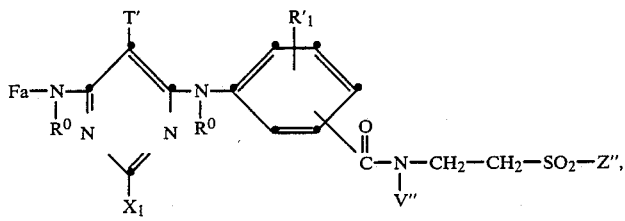 (1b)

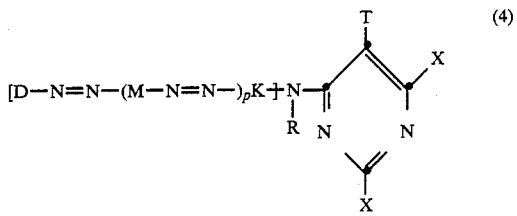 (4)

or

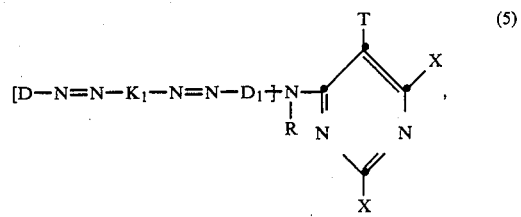 (5)

in which T' is methylsulfonyl or formyl, $X_1$ is chlorine or fluorine, $R^o$ and V" are independently of one another hydrogen, methyl or ethyl, $R_1$ is hydrogen, sulfo, ureido or carboxyl, and Z" is a —CH=CH$_2$, —CH$_2$—CH$_2$—OSO$_3$H, —CH$_2$—CH$_2$—Cl or —CH$_2$—CH$_2$—OCOCH$_3$ group.

12. A reactive dye according to claim 1, of the formula

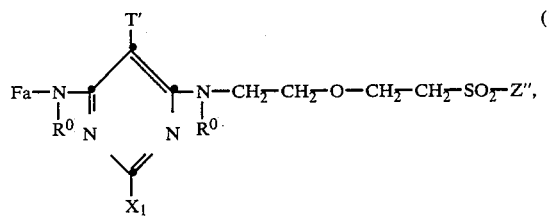 (1c)

in which T' is methylsulfonyl or formyl, $X_1$ is chlorine or fluorine, $R^o$ is hydrogen, methyl or ethyl, or ethyl, and Z" is a —CH=CH$_2$, —CH$_2$—CH$_2$—OSO$_3$H, —CH$_2$—CH$_2$—Cl or —CH$_2$—CH$_2$—OCOCH$_3$ group.

13. A reactive dye of the formula (1) according to claim 10, in which Fa is a monoazo, polyazo, metal complex azo, formazan or dioxazine dye radical which is substituted by sulfo and which is further unsubstituted or is further substituted by $C_1$-$C_4$alkyl, $C_1$-$C_4$alkoxy, $C_1$-$C_4$-alkanoylamino, benzoylamino, amino, unsubstituted or —OH, —OCOCH$_3$, —OSO$_3$H, —CN or halogen substituted in the alkyl moiety, N-mono- or N,N-di-$C_1$-$C_4$alkylamino, phenylamino, mono- or disulfobenzylamino, $C_1$-$C_4$-alkoxycarbonyl, $C_1$-$C_4$alkylsulfonyl,- trifluoromethyl, nitro, cyano, halogen, carbamoyl, N-mono- or N,N-di-$C_1$-$C_4$alkylcarbamoyl, sulfamoyl, N-mono- or N,N-di-$C_1$-$C_4$alkylsulfamoyl, N-mono- or N,N-di-($\beta$-hydroxyethyl)sulfamoyl, N-phenylsulfamoyl, hydroxyl, carboxyl, sulfo, sulfomethyl or ureido, R is hydrogen or an unsubstituted or halogen, hydroxyl, cyano, carboxyl, sulfo, sulfato, $C_1$-$C_4$alkoxycarbonyl or a $C_1$-$C_4$alkoxy-substituted $C_1$-$C_4$alkyl radical, T is cyano, nitro, chlorine, formyl, methylsulfonyl or ethylsulfonyl, one X is chlorine or fluorine and the other X is a group of the formula (2a) indicated in claim 10 and r is 1.

14. A reactive dye according to claim 1, of the formula in which D and $D_1$ independently of one another are a diazo component benzene or naphthalene radical, M is a benzene or naphthalene radical, K is a coupling component benzene, naphthalene or heterocyclic radical, $K_1$ is a coupling component aminonaphtholsulfonic acid radical, and p is 0 or 1.

15. A reactive dye which comprises a metal complex of a monoazo or disazo dye according to claim 14.

16. A reactive dye of the formula (1b) according to claim 11, in which Fa is a radical of the formula

[D—N=N—(M—N=N—)$_p$K—      (4') or

[D—N=N—K$_1$—N=N—D$_1$—      (5'), in which D and $D_1$ independently of one another are a diazo component benzene or naphthalene radical, M is a benzene or naphthalene radical, K is a coupling component benzene, naphthalene or heterocyclic radical, $K_1$ is a coupling component aminonaphtholsulfonic acid radical, and p is 0 or 1.

17. A reactive dye according to claim 16, in which Fa is a radical of the formula (4'), p is 0, D is a radical of the formula

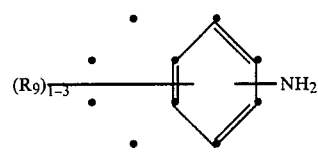

in which $R_9$ is 1 to 3 identical or different radicals selected from the group consisting of sulfo, aminomethyl, β-sulfatoethylsulfonyl and vinylsulfonyl, and K is the 1-amino-8-hydroxynaphthalene-3,6- or -4,6-disulfonic acid radical, the 2-amino-5-hydroxynaphthalene-7-sulfonic acid radical or an unsubstituted or sulfo or ureido substituted aniline radical.

18. A reactive dye according to claim 16, in which Fa diaminobenzene radical, and $K_1$ is the 1-amino-8-hydroxynaphthalene-3,6- or -4,6-disulfonic acid radical.

19. A reactive dye of the formula (1b) according to claim 11, in which Fa is a radical of the formula

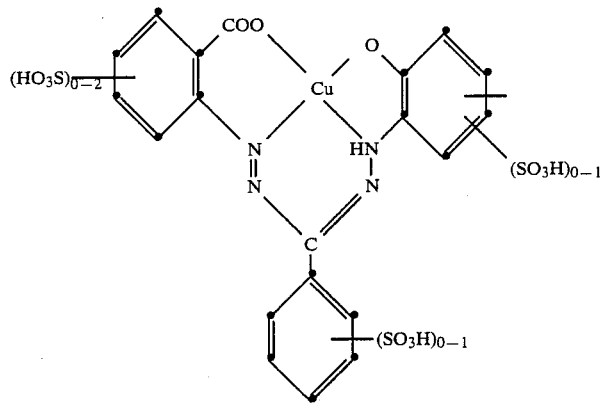

or

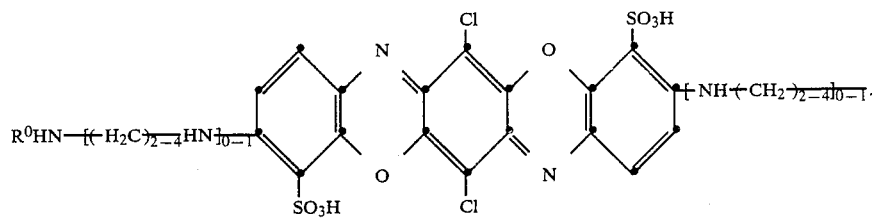

20. A reactive dye according to claim 1, of the formula (7)

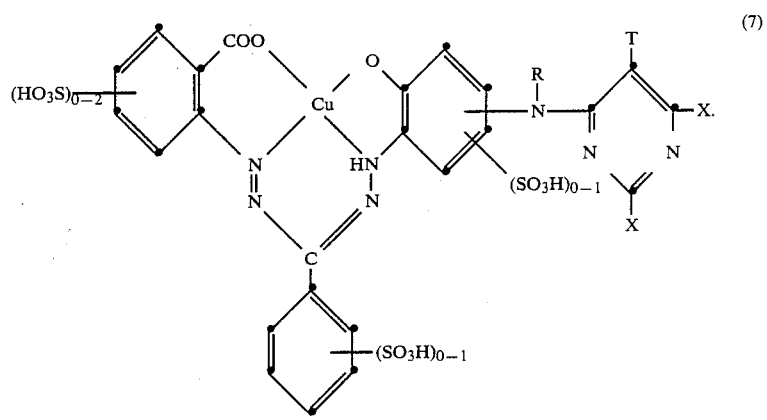

is a radical of the formula (5'), D is a sulfo, β-sulfatoethylsulfonyl or vinylsulfonyl substituted aminobenzene radical, $D_1$ is an unsubstituted or sulfo substituted 21. A reactive dye of the formula (1) according to claim 1, in whic Fa is a dioxazine dye radical of the formula

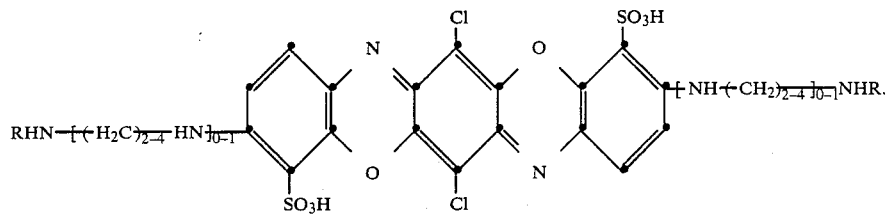

* * * * *